United States Patent [19]

Acheson

[11] Patent Number: 4,892,990
[45] Date of Patent: * Jan. 9, 1990

[54] AUTOMATIC WELDING APPARATUS FOR WELD BUILD-UP AND METHOD OF ACHIEVING WELD BUILD-UP

[76] Inventor: Rees Acheson, Hill Rd., Alstead, N.H. 03602

[*] Notice: The portion of the term of this patent subsequent to Aug. 18, 2004 has been disclaimed.

[21] Appl. No.: 120,393

[22] Filed: Nov. 12, 1987

Related U.S. Application Data

[63] Continuation-in-part of Ser. No. 945,182, Dec. 23, 1986, Pat. No. 4,687,899, which is a continuation of Ser. No. 707,341, Mar. 1, 1985, abandoned, and a continuation-in-part of Ser. No. 815,682, Jan. 2, 1986, which is a continuation-in-part of Ser. No. 759,543, Jul. 23, 1985, abandoned.

[51] Int. Cl.$^4$ ................................................. B23K 9/04
[52] U.S. Cl. ............................. 219/76.14; 219/125.11
[58] Field of Search ............. 219/76.14, 125.11, 125.1, 219/74, 75

[56] References Cited

U.S. PATENT DOCUMENTS

| | | | |
|---|---|---|---|
| 2,880,305 | 3/1959 | Baird | 219/137.2 |
| 3,248,515 | 4/1966 | Gorman et al. | 219/137.61 |
| 3,275,795 | 9/1966 | Bosna et al. | 219/125.11 |
| 3,627,973 | 12/1971 | Smith | 219/125.11 |
| 3,815,807 | 6/1974 | Bartley | 219/125.11 |
| 4,015,086 | 3/1977 | Thatcher | 219/60 A |
| 4,160,895 | 7/1979 | Hopper | 219/123.1 |
| 4,161,640 | 7/1979 | Bromwich et al. | 219/60 A |
| 4,199,673 | 4/1980 | Thiebaut et al. | 219/60 A |
| 4,215,809 | 8/1980 | Davis | 219/76.14 |
| 4,242,981 | 1/1981 | Bernard et al. | 219/76.1 |
| 4,323,750 | 4/1982 | Marmorat et al. | 219/76.1 |
| 4,357,515 | 11/1982 | Kiefer et al. | 219/60 A |
| 4,380,697 | 4/1983 | Kazlauskas | 219/136 |
| 4,514,443 | 4/1985 | Kostecki | 219/76.14 |
| 4,527,039 | 7/1985 | Fuwesi | 219/76.14 |
| 4,531,039 | 7/1985 | Okano et al. | 219/60 R |
| 4,538,046 | 8/1985 | Kazlauskas | 219/125.1 |
| 4,550,235 | 10/1985 | Fuwesi | 219/76.14 |
| 4,593,445 | 6/1986 | Snyder et al. | 219/76.14 |
| 4,647,749 | 3/1987 | Koshy | 219/76.14 |
| 4,687,899 | 8/1987 | Acheson | 219/125.11 |

OTHER PUBLICATIONS

Bacha, "Welding of Small Diameter Deep-Drilled Holes in Copper-Nickel", Welding Journal, Jan. 1978, pp. 29–35.

Primary Examiner—Clifford C. Shaw
Attorney, Agent, or Firm—Fish & Richardson

[57] ABSTRACT

Apparatus for weld build-up on an surface of revolution consists of an elongated, rotatable assembly that supports, at one end, an electrical welding torch (10) terminating in a nozzle, the rotatable assembly introducing electrical welding current, inert gas, and welding wire to the torch, and including an electrically conductive, hollow, metal drive spindle. The drive spindle (200) applies driving motion and conducts electrical current for transmission to the torch, and the gas and welding wire pass through the spindle to the torch. Also, an electrically conductive carrier (110) is mounted in a radially adjustable, electrically continuous, offset relationship to a conductive body (b 140) joined to the end of a spindle, and a torch held is in electrically conductive relationship by the carrier, the electrically conductive body and carrier together defining a gas tight passage (FIG. 6A) extending from the spindle to the torch, a connection cavity being defined at a motion interface between the carrier and the body to maintain gas flow continuity therebetween over their range of offset adjustment. A method for weld build up on a surface of revolution, and a system of orbital torch components (FIGS. 7A-7H) are also described.

19 Claims, 13 Drawing Sheets

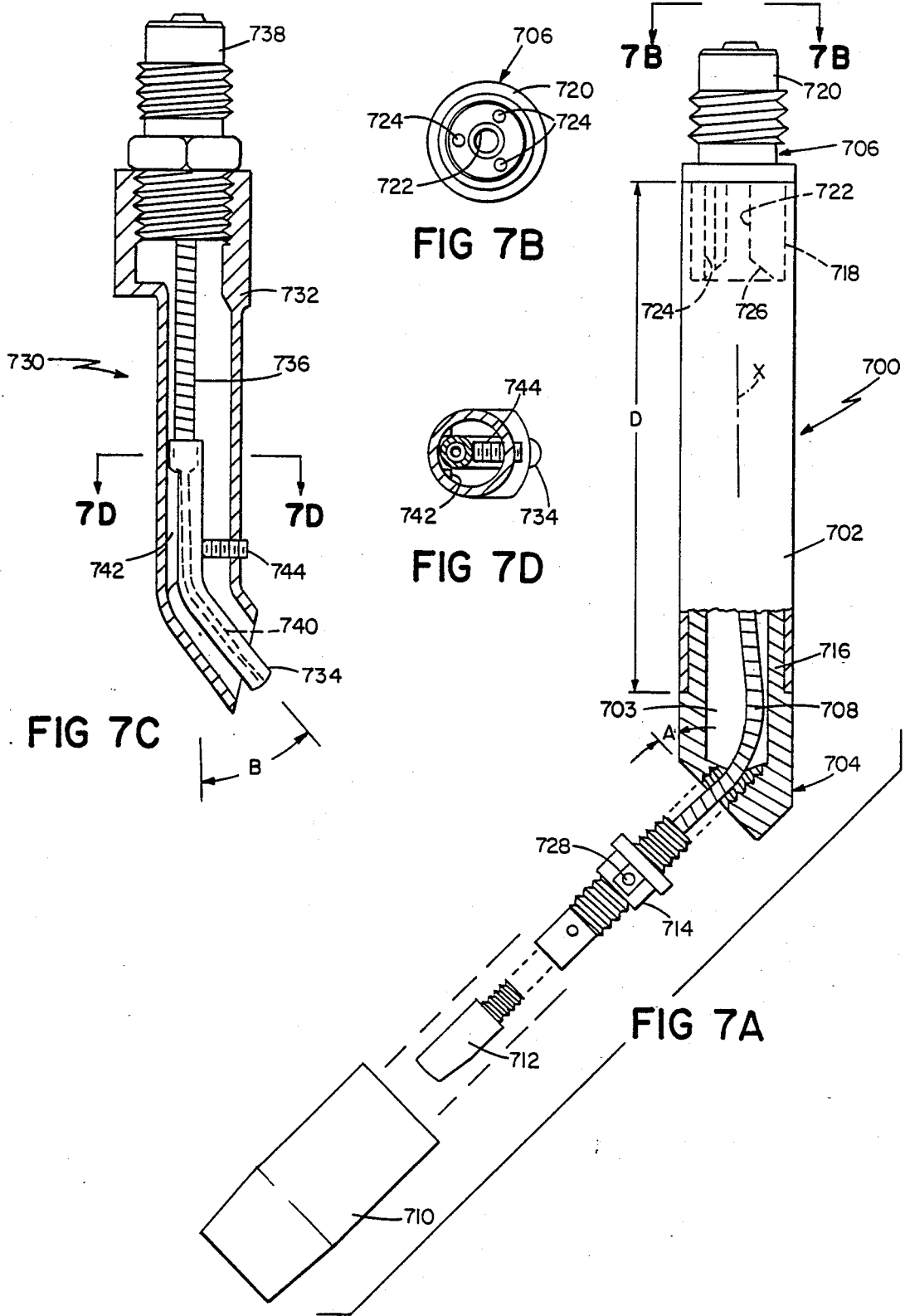

AUTOMATIC WELDING APPARATUS FOR WELD BUILD-UP AND METHOD OF ACHIEVING WELD BUILD-UP

The application claims benefit under 35 USC 120 of International Application No. PCT/US86/02498, filed November 20, 1986, and is a continuation-in-part application of U.S. Ser. No. 945,182, filed December 23, 1986, now issued as U.S. Pat. No. 4,687,899, which was a file wrapper continuation of U.S. Ser. No. 707,341, filed March 1, 1985, and abandoned December 23, 1986; and is a continuation-in-part application of U.S. Ser. No. 815,682, filed January 2, 1986, which was a continuation-in-part application of U.S. Ser. No. 759,543, filed July 23, 1985 and abandoned August 16, 1986. Application Ser. Nos. 815,682 and 759,543 were both also continuation-in-part applications of U.S. Ser. No. 707,341.

FIELD OF INVENTION

This invention relates to an automated welding apparatus for weld build-up and method of achieving the same. More particularly, it relates to a fully automated portable or stationary welding apparatus, using the MIG process (Metallic consumable electrode using Inert Gas), and method that is adapted to achieve circular welding on the bore surface or the outer surface of metallic objects arranged in various ways even where there is small free radial space in the immediate vicinity of the welding area.

DESCRIPTION OF THE PRIOR ART

One application of prior art welding apparatus is the building up of the bore outside diameter of a shaft or the inside diameter of a bore. Weld build up of a shaft may be necessary where, for example, the shaft has been inadvertently undersized during manufacture, or the outer surface of the shaft must be hard surfaced for a particular application. Weld build up of bores may be necessary where, for example, the bore has been worn oversize in service, the bore has been inadvertently oversized during manufacture, or the inner diameter of the bore must be hard surfaced for a particular application. In either case, the manner in which the welding apparatus achieves such build-up is similar. Illustratively, the welding apparatus fuses a layer of metal with an electric arc to the surface of the shaft or bore. Typically, the arc is initiated at some point on the surface of the shaft or bore to be welded and is moved around the circumference of the shaft or bore, depositing metal until the starting point is reached. At this time the arc is moved to a position contiguous to the deposited weld bead and again moved around the circumference of the shaft or bore for deposition of another weld bead. In this manner a layer of metal is fused to the surface of the shaft or bore with the axial length of the layer dictated by the number of weld beads deposited. One or more layers of metal can be fused to the surface of the shaft or bore depending upon the thickness of weld build up required for a desired application.

With manually operated welding apparatus, the weld deposit operation is suspended at the completion of each 360° of rotation of the torch. This allows the operator to step-up the torch one weld deposit diameter to a position contiguous to the completed weld bead for the next circular weld. The suspension of the weld deposit operation during step-up of the torch head changes the operating parameters of the nozzle of the torch head and hence can cause the physical characteristics of the weld deposit at the start of a contiguous weld circle to be of low quality in comparison to the weld deposit throughout the remainder of the weld circle. Such low quality welds are susceptible to stress failure as all the stress points caused by stopping and restarting cause a weak line all the way up the workpiece.

Automatic welding apparatus for effecting weld build-up about either the exterior or the bore surface of metallic objects are well known in the art. See, for example, U.S. Pat. Nos. 4,323,750; 4,215,809; 4,237,039; 4,550,235; and certain automatic welding machinery that is marketed by Cecil Peck Company, of Cleveland, Ohio.

The apparatus described in U.S. Pat. No. 4,323,750 is specifically designed as a lining machine in which the workpiece rotates. It is made for typically large diameter pipe that is to be lined with another material as in lining a cylinder with stainless steel for corrosion resistance. In this machine the whole welding apparatus enters the pipe which is then rotated on rollers.

The apparatus described in U.S. Pat. No. 4,215,809 is specifically designed for build-up but the apparatus is a lathe and rotates the workpiece while the welding head remains stationary, thus requiring that the workpiece be of limited size and configuration. For example, it would be difficult to build up the I.D. of a crosshold in the end of a long structure with this apparatus.

U.S. Pat. Nos. 4,237,039 and 4,550,235 by Fuwesi both describe portable apparatus for applying a weld bead to build up the inner surface of a bore on an article that may be stationary, and then using the major part of the same apparatus to grind the surface to achieve the desired diameter.

Regarding the apparatus of The Cecil Peck Company, generally, such welding apparatus consists of a module, equipped with all necessary mechanical and electrical components, that is adapted to be rotated about the parts to be welded. Typically a standard commercially available MIG welding unit designed for linear welding is used in such apparatus. For radial adjustment, the entire unit, consisting of the wire feed motor, gear reduction assembly, and the wire feed rolls, along with the torch head, gas hose, power cables, and the wire reel, must be offset and rotated, necessitating abundant clearances. This entire unit must orbit the workpiece even when welding a small bore. The welding power source and control box are the only components of the welding system that are remotely located from the weld site.

In addition to the above, U.S. Pat. No. 3,815,807 discloses a pipe welder made for joining two cylindrical objects and has no means for automatically stepping up to form contiguous beads for building up a surface. The machine is described as effecting only one 360° weld. It is then reversed in order to disentangle power leads, gas hose and welding wire. It is, therefore, difficult to use as a build-up machine.

Prior art welding apparatus having mechanisms for stepping-up the torch head after each circular weld has been finished typically include additional controls. These controls are provided for varying, e.g., the angular position of the torch head to the weld site or the radius of the circle that the nozzle will travel.

It is impractical under certain conditions to do build-up using the above described apparatus. For example, although acceptable for some applications, devices requiring rotation of the workpiece can only be used where space is sufficient for workpiece rotation. Also, some prior art devices have proved less than satisfactory due to lack of automatic step-up and the need for placement near the weld site of the cumbersome required equipment.

Also, in many circumstances, large, cumbersome items cannot be moved to the welding machine; and the configuration of some work pieces does not allow the area to be welded to be easily reached. In these cases, hand welding must be used, even though a hand weld cannot be evenly applied, nor can one be assured of voidless weld metal, or even distribution of heat, producing unpredictable warpage and shrinkage, and possibly cracks in the workpiece as well. In some cases, e.g., if the hole is too small or too deep, hand welding is impossible.

Furthermore, many automatic welding apparatus are not readily portable, i.e., they are of such enormity that they are affixed to a permanent work area. Even if they could be carried to the job site, they could not be easily mounted in proper operative position in a quick and efficient manner. Consequently, they are not readily adaptable for carrying out welding operations in the field. The cost of such equipment further limits their use in a repair situation or field work, instead, restricting them to production line use. In the prior art, field work has typically been done by hand where at all possible or the equipment dismantled, with a smaller section transported to the automatic welding apparatus in the permanent work area, while the equipment sits idle in the field.

SUMMARY OF THE INVENTION

According to the invention, an apparatus for weld build-up on a surface of revolution comprises an elongated, rotatable assembly that supports, at one end, an electrical welding torch that terminates in a nozzle, the rotatable assembly being adapted to introduce electrical welding current, inert gas, and welding wire to the torch. The apparatus is characterized in that the assembly comprises an electrically conductive, hollow, metal drive spindle, means are provided for both applying driving motion to and conducting electrical current by the metal drive spindle for transmission to the torch, and the gas and welding wire pass through the current-carrying spindle to the torch.

In preferred embodiments, the apparatus further comprises means for continuously rotating the spindle without axial movement, and means for moving the spindle stepwise in an axial direction at the completion of each circumferential pass of the nozzle over the surface to axially reposition the welding nozzle for depositing successive, side-by-side, circular weld beads along the surface as the nozzle rotates with the spindle; the welding apparatus is further characterized in that the conductive spindle is rotatably mounted by insulative bearings, within a hollow quill non-rotatably mounted in a manner permitting axial motion, thereby to move the spindle axially, preferably the conductive spindle is driven by a motor insulated from and mounted to move axially with the spindle; a power connector introduces welding current from a stationary source directly to the conductive spindle at a point spaced downstream from the position at which welding wire and gas are introduced into the spindle, preferably the welding wire is slidably confined within a non-insulated liner disposed within a bore of the conductive hollow spindle; the apparatus includes an electrically conductive carrier mounted in a radially adjustable, electrically continuous, offset relationship to a conductive body joined to the end of a spindle, the torch being held in electrically conductive relationship by the carrier, preferably the electrically conductive body and carrier defining a gas tight passage extending from the spindle to the torch, a connection cavity means being defined at a motion interface between the carrier and the body to maintain gas flow continuity therebetween over their range of offset adjustment, the carrier comprising a metal block having a slidable connection interfitting with a mating connection on the body and a threaded connection for holding the torch, and the welding wire being slidably confined within a liner that extends from the hollow spindle, through the cavity means and through the passage within the carrier, to the torch; the torch comprises an electrically conductive body threaded in electrically conductive relationship to its support, preferably an electrically conductive torch extension supports the torch body, the torch extension in turn being threaded in electrically conductive relationship to its support; and the means for conducting electrical current to the drive spindle comprises a rotatable power connector comprising first and second metal housings and first and second current conductive washers, the first housing being fixedly attached to the spindle, the second housing being provided with an electrical power conduit, the first washer being fixedly attached to the first housing, the second washer being fixedly attached to the second housing, and both said second washer and said second housing being slipped over a stem of the first housing, the housings and the washers providing the rotatable power connector with electrical power transmission means, preferably the second washer lies contiguous to the first washer and is held in sliding contact to the first washer by a securing means, preferably, the power connector further comprises a stem portion extending axially from the second housing through the first housing and in encircling relationship with the spindle to define a first annular chamber between the stem portion and spindle, and slidable electrical contact surfaces fixed to the housings and in axial engagement with each other at a location radially outward of the stem portion, the housings being axially spaced from each other between the stem portion and the electrical contact surfaces to define a second annular chamber, preferably the rotatable power connector is made of a solid bronze, preferably the rotatable power connector is attached about the rotatable drive spindle, leaving the first end of the spindle free for entrance of welding wire and inert gas, preferably the rotating power connector comprises torque resisting means including an eyescrew attached to an external surface of the second housing for receiving and holding a torsional resistance bar that is attached to a stationary surface, and preferably the securing means comprises a spring through ball thrust bearing.

According to another aspect of the invention, an apparatus for weld build-up on a surface of revolution comprises an elongated, rotatable assembly that supports, at one end, an electrical welding torch that terminates in a nozzle, the rotatable assembly is adapted to introduce electrical welding current, inert gas, and welding wire to the torch, and is characterized in that it comprises an electrically conductive carrier mounted in a radially adjustable, electrically continuous, offset relationship to a conductive body joined to the end of a drive spindle, and a torch is held in electrically conductive relationship by the carrier, the electrically conductive body and carrier defining a gas tight passage extending from the spindle to the torch, a connection cavity means being defined at a motion interface between the carrier and the body to maintain gas flow continuity therebetween over their range of offset adjustment.

In preferred embodiments of this aspect of the invention the carrier comprises a metal block having a slidable connection interfitting with a mating connection on the body and a threaded connection for holding the torch; and welding wire is slidably confined within a liner that extends from the drive spindle, through the cavity means and through the passage within the carrier, to the torch.

According to still another aspect of the invention a method of weld buildup on a surface of revolution comprises the steps of:
 (a) holding the workpiece fixed against rotation;
 (b) rotating an orbital welding torch in a circular path in an amount equal to about 360° around the surface to a limit point while at the same time continuously feeding weld wire from a source of wire and electrical power to the torch to form a substantially circular weld bead on the surface;
 (c) immediately stepping the torch in an axial direction upon the torch reaching the limit point for a distance equal substantially to the width of the circular weld bead while at the same time continuing to rotate the torch and continuing to feed the wire and electrical power to the torch;
 (d) rotating an orbital welding torch in a circular path in an amount slightly less than 360° around the surface to a limit point while at the same time continuously feeding weld wire and electrical power to the torch to form a substantially circular weld bead on the surface;
 (e) repeating step (c);
 (f) repeating steps (d) and (c) as desired; and
 (g) lastly, repeating step (b).

According to still another aspect of the invention, for use in weld build up of a surface of revolution, an orbital welding torch system of a minimal number of components adapted for assembly, at a work site, into a torch of axial length and radial offset determined for the welding job to be performed comprises a welding torch comprising, a torch body of length determined for the welding job to be performed, a male coupling connected to a first end of the torch body and adapted for coupling the torch to a welding machine, a torch head connected to a second end of the torch body and defining an end surface disposed at an angle to the axis of the torch body, the surface supporting a gas diffuser and a contact tip surrounded by a welding nozzle, a conduit liner means extending through the male coupling member, the body, and the torch head, the liner defining a conduit for passage of welding wire therethrough to the contact tip, the male coupling member, the body and the welding head together defining a conduit for passage of inert gas through the torch into the diffuser, and the male coupling member, the torch body, torch head, diffuser, contact tip and nozzle being of electricity-conducting material for transmission of electrical current therethrough.

In preferred embodiments of the torch system the torch body comprises a length of tubing having an inner diameter sized to receive the male coupling member and the torch head in press fit; the system further comprises at least one torch extension means for increasing the axial extent of an assembly including the torch, the torch extension comprising: and extension body of length determined for the welding job to be performed, a male coupling member connected to a first end of the extension body and adapted for coupling to a welding machine, a female coupling member connected to a second end of the extension body and adapted for coupling to a male coupling member, and a conduit liner means extending through the male coupling member, the body and the female coupling member, the liner defining a conduit for passage of welding wire therethrough, the male coupling member, the body and the female coupling member together defining a conduit for passage of inert gas therethrough, and further being of electricity-conductive material for transmission of electrical current therethrough; the torch system further comprises a ball swivel connector comprising: a body member having a male coupling member for connection of the connector to a welding machine, a swivel member pivotally connected to the body member and having means for connection of a male coupling member thereto, and a conduit liner extending through the body member and the swivel member to define a conduit for welding wire therethrough, the body member and the swivel member further defining a conduit for passage of inert gas therethrough and being formed of electricity-conducting material for transmission of electrical current therethrough, the swivel member adapted to be disposed with its axis at an angle to the axis of the body member for positioning a torch nozzle at a point offset from the axis of a welding machine, while maintaining passage of gas, electrical current and welding wire therethrough; preferably the system further comprises means for fixedly clamping the swivel member relative to the body; and the system further comprises means for rotational orientation of an assembly of system components relative to a welding machine comprising: rotatable means adapted for threaded engagement by a male coupling member, and clamping means for fixing the rotatable means relative to the welding machine.

Objectives of my invention include providing for a welding apparatus and method that may conveniently, accurately and cost effectively weld inner or outer circular surfaces of comparatively small or large diameters in a continuous operation, providing even, concentric welds. This is an advantage, for instance, for buildup of worn cylindrical bearing surfaces, both inner and outer, for the repair of broken shafts and cylinders on unwieldly equipment, or for other occasion requiring a circular, evenly applied, strong weld deposit. A further objective is to provide a welding system that permits quick and efficient assembly, in the field, with a torch properly sized axially and radially for a particular job to be performed.

BRIEF DESCRIPTION OF THE DRAWINGS

FIG. 5b is a cross-sectional view taken along lines 5b—5b of FIG. 5a;

FIG. 7A is a side view partially in section of a torch assembly of the invention, while FIG. 7B is an end view on line 7B—7B;

FIG. 7C is a side section view of another torch assembly of the invention for small diameter bores, while FIG. 7D is an end section view on the line 7D—7D;

FIG. 7E is a side section view of a torch extension assembly according to the invention, while

FIG. 9a is an enlarged cross-sectional view of a part of FIG. 9 showing the slip-ring construction for supplying electrical power to the wire feed device of the embodiment shown in FIG. 9;

DETAILED DESCRIPTION OF THE PREFERRED EMBODIMENT

Figure 1:
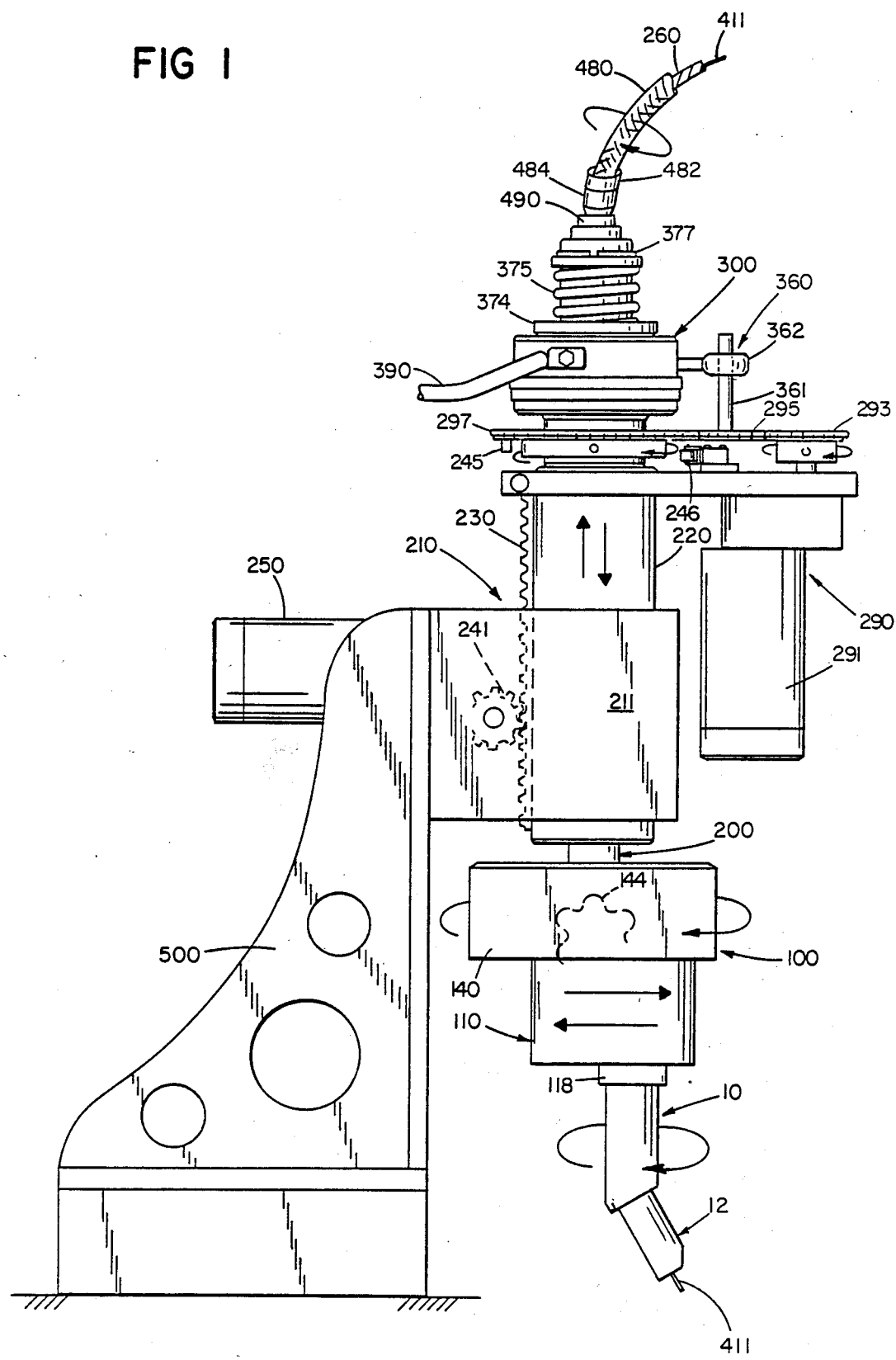
FIG. 1 is a side view of the bore build-up unit of the portable welding apparatus of the present invention as it is mounted to a welding stand with magnetic base.
Figure 2:
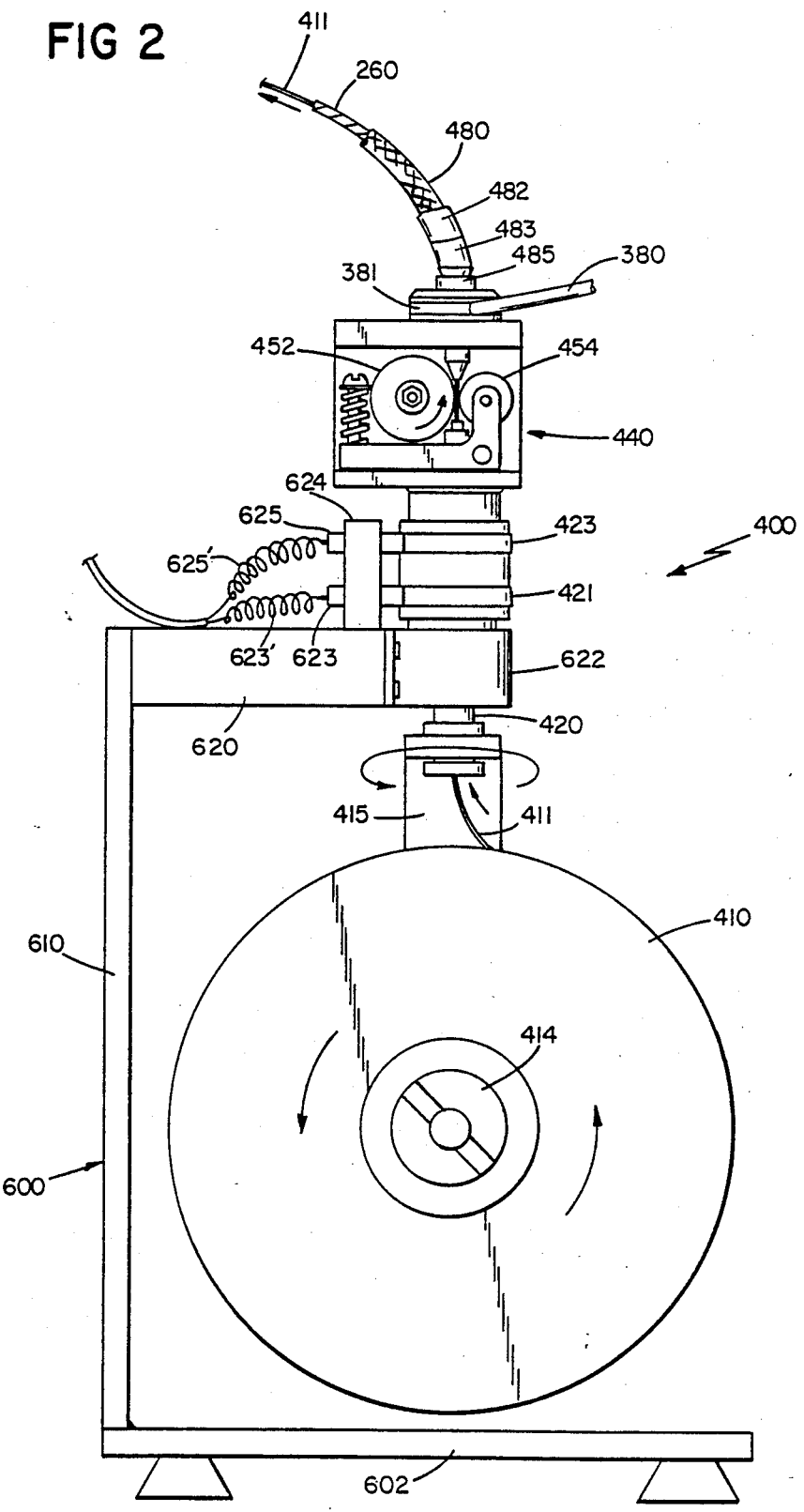
FIG. 2 is a side view of one embodiment of a remote wire feed device for use with the welding apparatus of the present invention as it is mounted to a platform.
Figure 3:
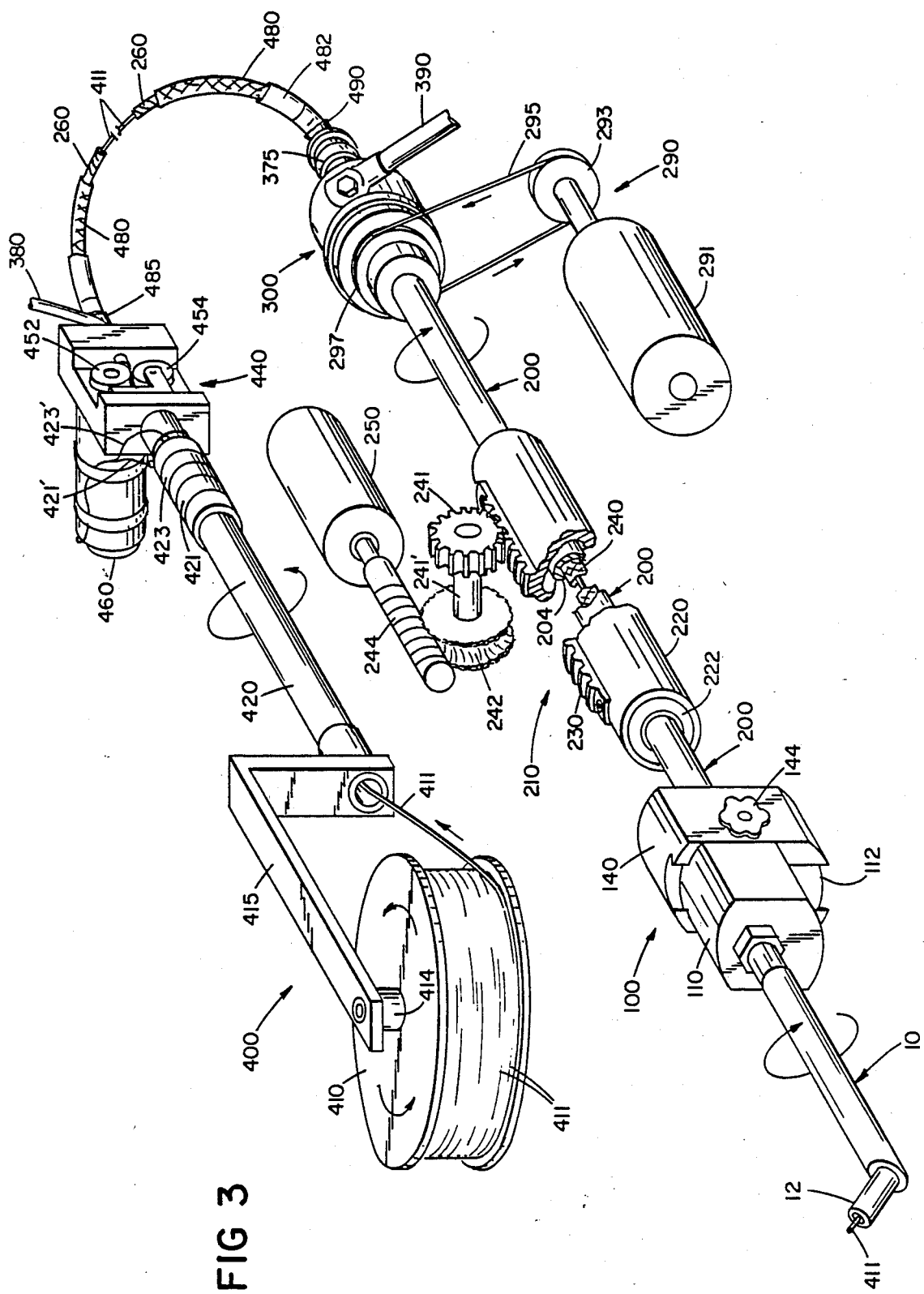
FIG. 3 is a diagrammatic view of a portion of the welding apparatus of the present invention.

FIGS. 1, 2 and 3 show one embodiment of the welding apparatus of the present invention.

As shown in FIGS. 1 and 3, a bore build-up unit of the welding apparatus of the present invention comprises a rotatable spindle 200 connected at one end to a rotating means 290 via a rotatable power connector 300. An orbital welding torch 10 is connected at the other end of the spindle 200 through an offset adjustment means 100. A quill positioner 210 is also associated with the rotatable spindle 200 for control its axial movement.

Figure 6A:
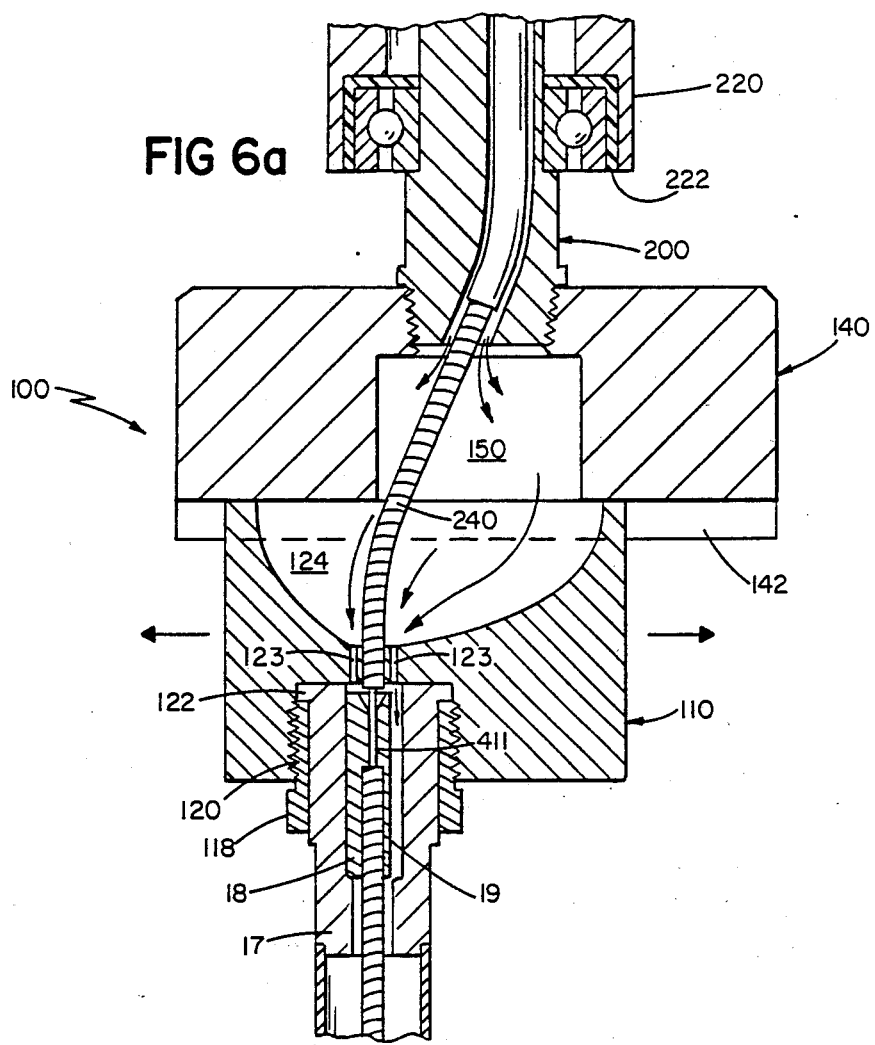
FIG. 6A is an enlarged cross-sectional view of an orbital welding torch connected to the offset adjustment means of FIG. 3.

As is shown more clearly in FIG. 3, rotatable spindle 200 consists of a metal rod with a longitudinally extending enclosed passage in the form of a axially-aligned center hole or bore 204. The rotatable spindle extends through the center of rotatable power connector 300 and quill 220 of quill positioner 210, and is attached to the body of the offset adjustment means or carrier assembly 100 by a thread connection 148 (FIG. 6a). (The spindle 200 and offset adjustment means 100 may be permanently joined, e.g., by welding or by pinning.)

The center bore of the rotatable spindle is sized to allow a piece of flexible conduit liner 240 to extend the entire length of the spindle for communication with offset adjustment means 100, with sufficient clearance between the outside of the conduit liner 240 and the bore of the rotatable spindle for passage of inert gas, supplied through hose 482 about the wire feed, as described below, to communicate with the orbital welding torch 10. The clearance provides the rotatable spindle with gas transmission means.

The flexible conduit liner has a diameter large enough to receive and hold welding wire 411 and hence provides the rotatable spindle with wire transmission means. In this regard, welding wire 411 is pushed from wire feed device 400 by the feed rolls, 452 and 454, through a conduit liner 260 of the hollow flexible shaft 480, into flexible conduit liner 240 within rotatable spindle 200 and on into offset adjustment means 100 for communication with the orbital welding torch 10.

Inert gas enters the hose 482 surrounding the hollow flexible shaft 480 through conduit 380 (FIG. 2) via a slip coupling 381 adjacent the wire feed housing 440. The inert gas follows the passageway defined between the shaft 480 and hose 482, to enter spindle 200.

Electrical welding power, through conduit 390, enters the spindle 200 through rotatable power connector 300.

The rotatable spindle 200 thus carries the inert gas, the electrical welding power and the welding wire to the offset adjustment means for communication with the orbital welding torch.

Referring further to FIG. 3, rotating means 290 comprises sprockets 293, 297, a chain 295 and a drive motor 291. Sprocket 297 is a conventional drive sprocket bored to fit loosely over the rotatable housing part of power connector 300. The space is filled with epoxy which both electrically isolates and secures sprocket 297 to rotatable power connector 300. Rotation of drive motor 291 rotates driving sprocket 293 and driven sprocket 297 through chain 295. Rotation of driven sprocket 297 causes the rotatable power connector to rotate, which, being secured to the rotatable spindle, as more fully described below, causes the rotatable spindle to rotate in endless rotation.

Figure 4:
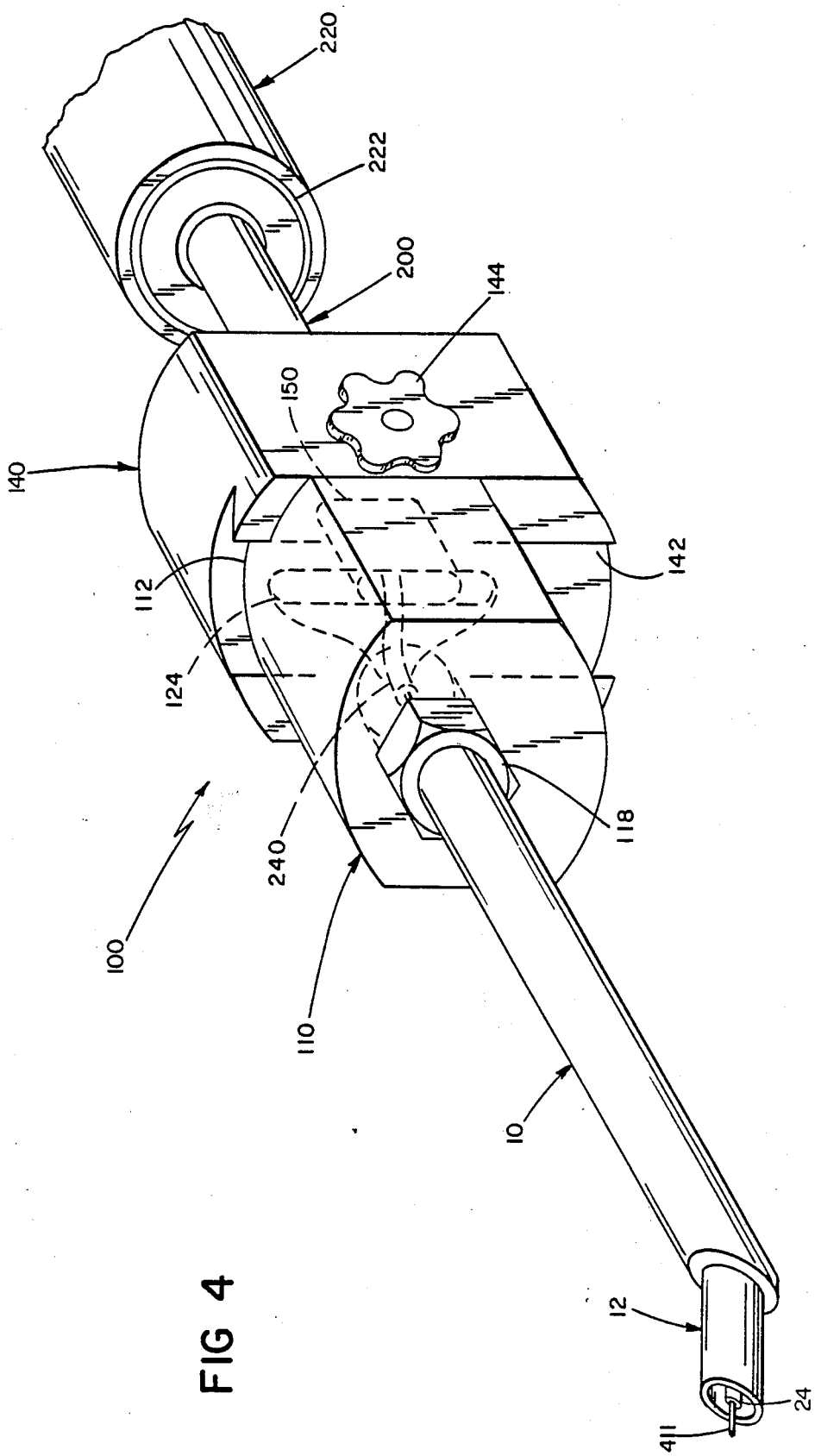
FIG. 4 is an enlarged view of an offset adjustment means, e.g., as used in the unit of FIG. 1, showing slots for passage of welding wire and gas.
Figure 5A:
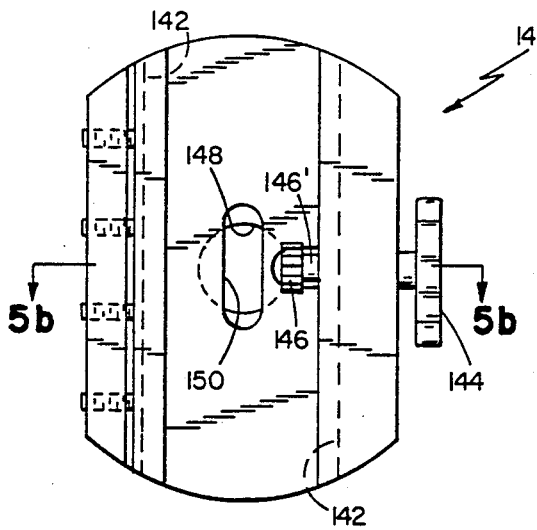
FIG. 5a is a bottom view of the body member of the offset adjustment means shown in FIG. 4.
Figure 5B:
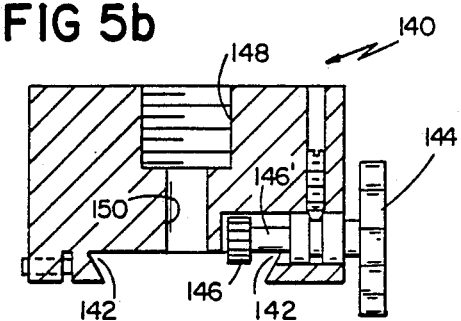

As shown in FIGS. 4 and 6a, offset adjustment means 100, consisting of body member 140 and sliding torch holder 110, connects the orbital welding torch 10 to the rotatable spindle 200. The body member and sliding torch holder each have an internal cavity and openings at two ends. The cavities provide the offset adjustment means with means for continuous transmission of gas and welding wire in all possible radial positions, and the body of the offset adjustment means provides means for electrical power transmission. The body member and torch holder of the offset adjustment means member are fitted to one another by a dovetail 112 which allows the torch holder to slide in a radial direction in the body member. The body member is provided with a hand knob 144 connected to means (FIGS. 5b and 5d) within the body member for this purpose. Advantageously, when orbital welding torch 10 is attached to torch holder 110, and the rotatable spindle is attached to body member 140, any radial sliding motion of the torch holder to the body member permits the axial position of the orbital welding torch to be offset in relation to the axial position of the rotatable spindle. This offset of the torch holder to the body member determines the radius of the orbital welding torch and hence the radius of the circle to be welded.

Figure 5D:
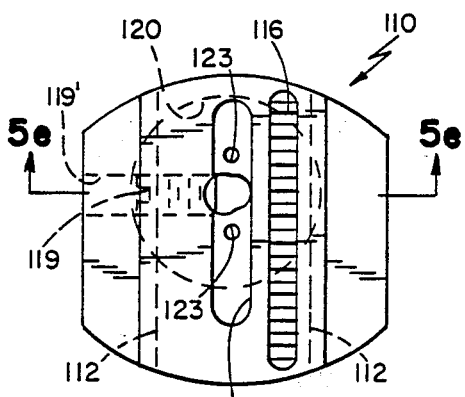
FIG. 5d is a top view of the torch holder of the offset adjustment means shown in FIG. 4.
Figure 5E:
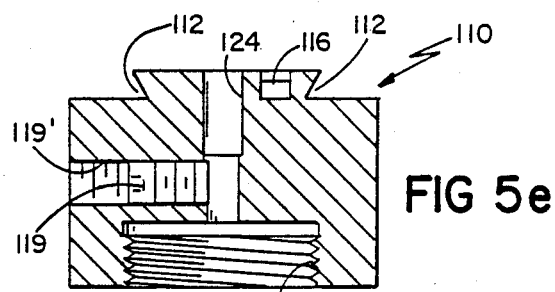
FIG. 5e is a cross-sectional view taken along lines 5e—5e of FIG. 5d.
Figure 5C:
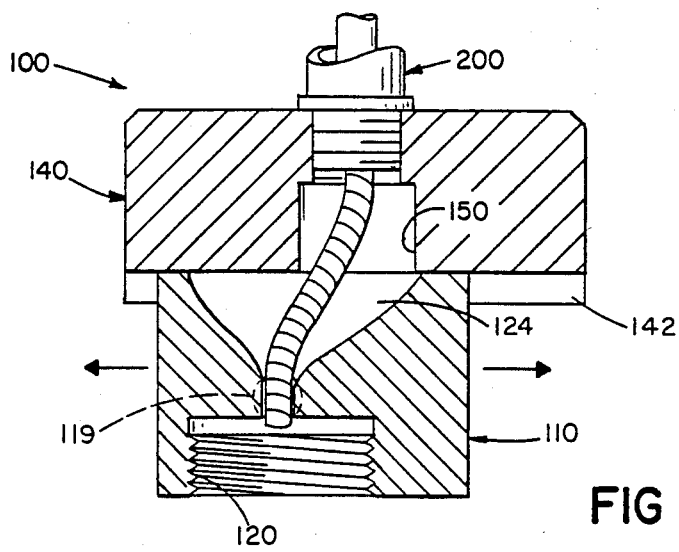
FIG. 5c is a side cross-sectional view of the assembled adjustment means shown in FIG. 4.

The means internal to the offset adjustment means member for moving the torch holder relative to the body member is shown in FIGS. 5a–5e, with 5a and 5b showing the body member 140 and FIGS. 5d and 5e showing the torch holder 110. The body member is provided with a recessed dovetail 142 in order to engage dovetail 112 of the torch holder when the two are fitted to one another (FIG. 5c). Within the body member is a pinion 146 which mates with a rack 116 in the torch holder. Turning of a hand knob 144 connected to the pinion, via a pinion shaft 146', forces the dovetail of the torch holder to slide in the recessed dovetail of the body holder. The top of the body member also has a threaded hole 148 to engage screw threads on the bottom end of the rotatable spindle (FIG. 6a). The bottom of the sliding torch holder also has a threaded hole 120 to allow connection of the orbital welding torch. The torch is held in place by an externally threaded bushing 118, pressing against a small flange 122, shown in FIG. 6a, at the wire receiving end of the torch 10.

As shown in FIGS. 4, 5a, 5b and 5c, the body member 140 and sliding torch holder 110 of the offset adjustment means are provided with cavities 150 and 124 respectively. These cavities provide openings or passageways for passing the flexible conduit liner 240 from the rotatable spindle through the offset adjustment means and into the orbital welding torch. These slots are milled within the central section of the members parallel with the dovetails. The width of the slots is larger than the diameter of the flexible conduit liner 240 in order to loosely receive this liner. In addition, these slots are sufficiently long to permit the torch holder to move relative to the body member without damaging the flexible conduit liner 240 containing welding wire as the liner snakes its way from the rotatable spindle to the torch. The flexible liner provides the offset adjustment means with wire transmission means. Gas also passes through these slots 124, 150, and the sliding surfaces of the dovetail of the body member and torch holder are closely fit in order to prevent gas leakage.

Referring to FIG. 5e, a set screw 119 is provided in a threaded hole 119' in the torch holder in order to secure the end of the flexible conduit liner 240 to the holder and in communication with the end of the torch to be connected to the threaded hole 120 of the holder. The bottom of the slot 124 is reamed at the connection of the liner 240 to permit gas to pass through the slot. Also, holes 123 are provided for passage of gas. See also FIG. 6a.

FIG. 6a shows a cross-sectional view of one embodiment of an orbital welding torch 10 comprising tube 16 and weld nozzle 12 attached to offset adjustment means member 100. Drilled plugs 14 and 17 are welded to the outer tube; plug 17, at the receiving end of the torch, is machined to fit into the threaded hole 120 of the torch holder 110 of the offset adjustment means member 100. The second plug 14 is machined to fit a diffuser 22 such as a standard MIG diffuser to hold contact tip 24 within weld nozzle 12.

A flexible conduit liner 21, with a transitional fitting 18 attached to one end, is inserted through drilled plug 17 and extends through tube 16. This conduit receives the welding wire 411 and provides the torch with wire transmission means. The transitional fitting has two ducts, one of which is shown at 19, milled along two sides of the cylindrical fitting. These ducts together with the tube 16 define a longitudinally extending enclosed passage through the torch to provide gas transmission means for the torch. These ducts allow passage of inert gas from holes 123 and slot 124 of the torch holder 110 of the offset adjustment means member 100 to the space between liner 21 and tube 16 of the orbital welding torch. Tube 16, defining the body of the torch, provides the torch with electrical power transmission means.

Figure 6B:
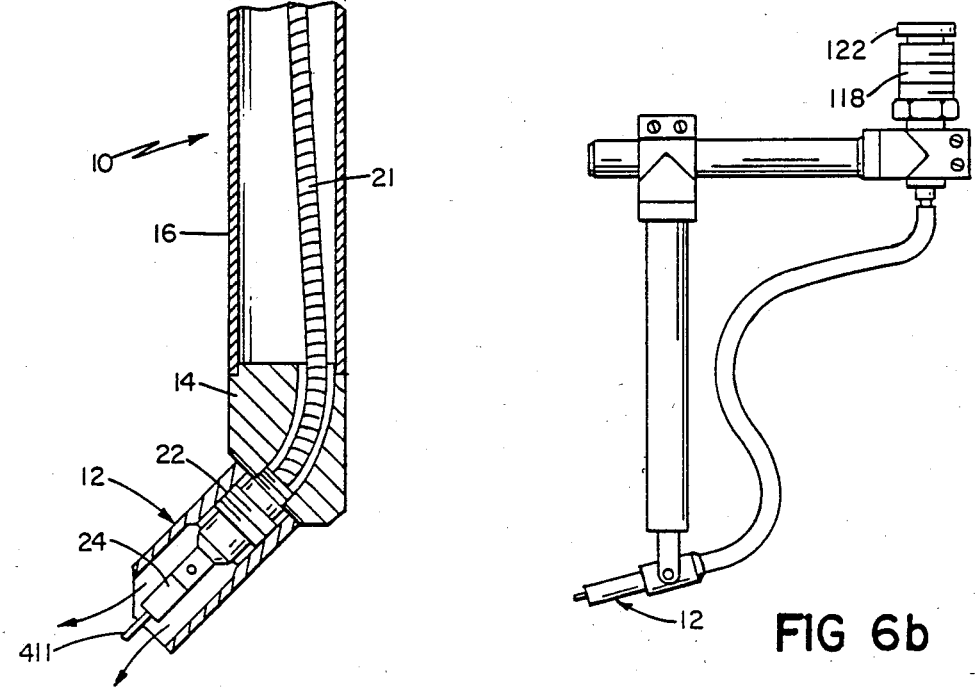
FIG. 6B is a side view of a further embodiment of welding torch of the present invention designed for large bores, and for welding outer surfaces of workpieces.

FIG. 6b shows an extension torch for lengthening the radius which the torch can weld. The nozzle 12 can also be pivoted inwardly to weld the outside of a boss, shaft or the outer circumference of a metallic object. This illustrates the versatility of the machine.

Referring to FIG. 7A e.t. seq., a torch system for quickly assembling components into torches of different length, angle and offset, as required for efficiently performing a task at hand, will now be described.

To permit repair welding in the field on all manner of bore diameters and depths, without requiring that there be carried to the work site in the field a large inventory of torches of different configurations, there is provided a system of torch components.

Referring to FIG. 7A, a torch assembly 700 consists of a body 702, a torch head 704, a male coupling member 706, a flexible conduit liner 708, a nozzle 710, a contact tip 712, and a gas diffuser 714. Body 702 consists of drawn-over-mandrel tubing having an accurate inner diameter. Torch head 704 is machined from cylindrical bar stock with a first end 716 sized for press fit within the torch body and a second end surface machined an angle, A, to the torch body axis, X. The angled end surface is drilled and tapped to receive the end of diffuser 714. Male coupling member 706 is similarly machined from cylindrical bar stock with a first end 718 sized for press-fit within the torch body and a second end 720 externally threaded for engagement with other components of the system, described below. Referring to FIG. 7B, male coupling member 706 defines a coaxially drilled through hole 722 sized to allow the insertion of a length of flexible conduit liner 708. Surrounding this through coaxial hole are axially drilled several smaller through holes 724. These smaller holes transmit inert gas to the torch body chamber 703. To complete the male coupling member, at its first end, a large, 60 degree countersink 726 is made at the through coaxial hole. The other end of the conduit liner 708 extends through head 704 into gas diffuser 714. Diffuser 714 is a commercially available product, typically machined from brass, and may be provided with a set screw 728, although not required. Contact tip 712 and nozzle 710, both formed of copper, are constructed for threaded engagement with the diffuser.

To assemble a torch 700, a piece of tubing is cut to a desired length, D, determined by the depth of the bore to be built-up, to form body 702. A torch head 704 is pressed into one end of the tubing, the angle, A, of the end surface, e.g., typically 45°, also being selected on the basis of the job to be performed. A length of flexible conduit liner 708 is inserted through the drilled threaded hole in the head and into the body until it exits via hole 722 in the male coupling member 706 (the funnel-shaped counter sink 726 aiding this process). Diffuser 714 is slipped over the end of the conduit and secured by means of set screw 728. The diffuser 714 is screwed into the tapped hole in the head. At this point, the opposite end of the flexible conduit liner will be nearly flush with the end surface of the male coupling member, protruding by no more than a small amount. Contact tip 712 and nozzle 710 are then screwed onto the diffuser.

In operation, inert gas under light pressure travels through the several small axial holes in the male coupling member 720 and into the body chamber 703. The inert gas is contained by the body chamber. The diffuser 714, being exposed at its rear end to the gas under presure in the body chamber, diffuses gas into and out the end of the gas nozzle 710 which surrounds the contact tip 712 and directs gas out around the welding arc.

Welding wire is fed into the flexible conduit liner 708 at the male coupling end. The liner guides the wire through the body chamber and into the diffuser and on to the contact tip.

Electrical current travels through the metallic male coupling member, body tube, head and diffuser to the contact tip.

Referring to FIGS. 7C and 7D, a small bore torch 730, sized for use in bores in the range of ⅞ inch (2.25 cms) to 2 ½ inch (6.35 cms) diameter, consists of a torch body 732, a contact tip 734, a flexible conduit liner 736, and a male coupling/torch end fitting 738. Flexible conduit liner 736 is a short piece of spirally wound heavy wire as described above. The contact tip 734 is a bent piece of copper rod machined with a multi-diameter hole 740 axially through its center. The hole at the wire-receiving end of the contact tip is large enough to accept the end of the flexible conduit liner for a short depth. The hole then narrows to a loose clearance hole for the welding wire. Past the bent section of the contact tip, the hole narrows still further making it a good fit around the welding wire to ensure smooth electrical flow and wire travel, as well as to accurately guide the wire into the weld puddle. (The machining of the contact tip is done before it is bend to shape, and the hole at the bend is a loose clearance as otherwise the bending would pinch the hole preventing passage of the wire.) The torch body 732 consists of a hollow, straight-sided tube which at one end is made larger in diameter to accept internal threads (these threads may be offset to increase the reach of the torch, as shown, or they may be concentric). These threads fit the torch end fitting 738, described below. The other end of the torch body is formed to change the angle of the tube to a new angle, B, to the axis of the torch body, e.g., angle B may be about 30°. The end of the tube is cut to an angle, e.g., of about 12 degrees, from the axis of the torch body to form the nozzle end from which the contact tip protrudes and welding takes place. Just before the bend to the new angle, B, in the torch body, on the back side (the nozzle side being the front), there is machined or cast a small half round seat 742. Opposite this seat, in the wall of the tube, is a threaded hole for a set screw 744. Set screw 744, threaded into this hole, clamps contact tip 734 in place against the seat.

The torch end fitting 738 is a small piece of hex bar stock machined with threads on both ends. One end is machined to fit the torch body threads. The other end is machined to form a male coupling. The interior of the torch end fitting is similar to the male coupling member 706, described above, having an axial hole through its center to accept flexible conduit liner 736, and surrounding the central hole, several small axial through holes to transmit inert gas to the interior of the torch body and thus to the nozzle.

To assemble the small bore torch 730, the contact tip 734 is clamped in place in the seat 742 provided. The conduit liner 736 is inserted into the torch body 732 from the threaded end and slipped into the hole at the receiving end of the contact tip. This hole holds the conduit liner in place, keeping it aligned with the contact tip so that wire travels from the liner into the contact tip. Finally, the torch end fitting 738 is slipped over the protruding flexible conduit liner, and the end fitting is threaded into its seat in the torch body, with the end of the conduit liner flush with or protruding by only a small distance from the surface of the coupling.

The torches described above with reference to FIGS. 7A through 7D may be used with the orientation fitting (described below) alone, or may be employed in conjunction with other components of the torch system.

Figure 7H:
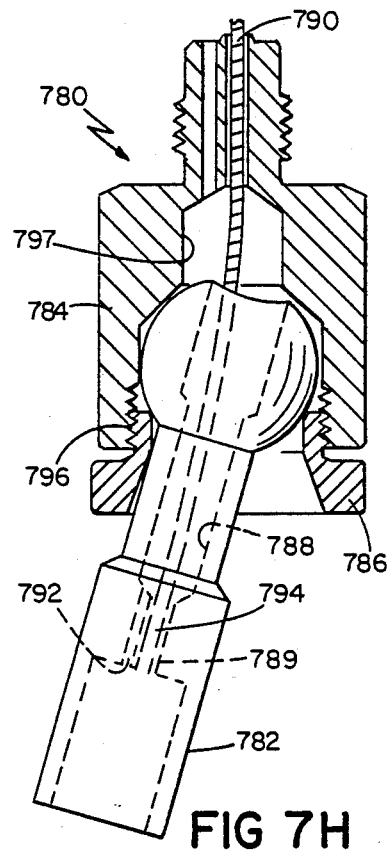
FIG. 7H is a side view, partially in section, of an adjustable ball joint adapter.
Figure 7F:
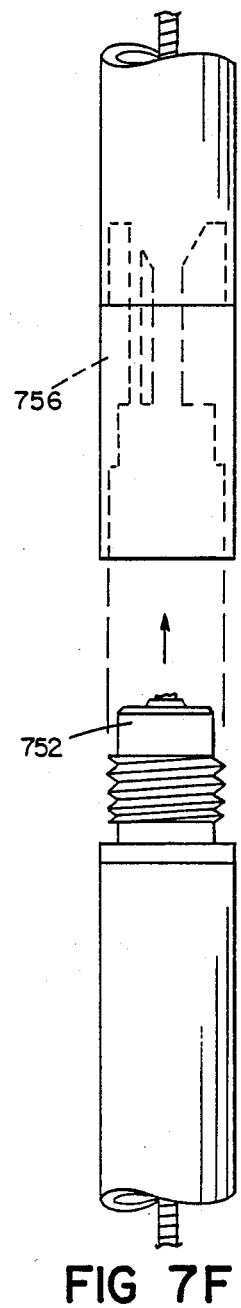
FIG. 7F is a side view of the interengaging portions of a pair of extensions.
Figure 7G:
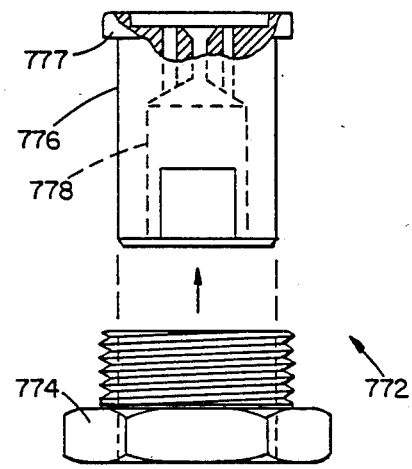
FIG. 7G is a side view, partially in section, of a torch orientation fitting.
Figure 7E:
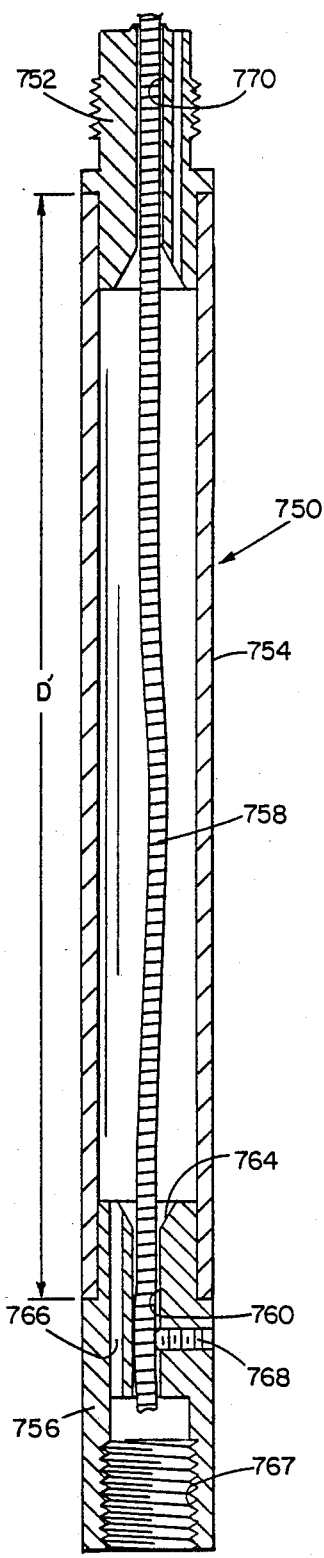

Referring to FIG. 7E, there is shown a torch extension 750 for increasing the axial reach of a torch to and/or into a hole. Rather than requiring the user to have many expensive torches of varying lengths in anticipation of future undefined jobs, the torch extensions economically and efficiently extend the axial reach of his torch. Torch extension 750 consists of a male coupling member 752, identical to the male coupling member 706, described above; an extension body tube 754, made from a length of drawn-over-mandrel tubing, as was the torch body 702; a female coupling member 756; and a flexible conduit liner 758. The female coupling member consists of a piece of cylindrical bar stock. A first end is turned for a press fit into the extension body 754. An coaxial through hole 760 is drilled to accept a length of flexible conduit liner. The central liner hole is surrounded by several small through axial holes 766 to transmit inert gas. A large, 60 degree countersink 764 is made into the central liner hole at the first end. (So far the female coupling member is identical to the male coupling member.) The second end of the female coupling member is drilled and tapped 767 for a mating thread to a male coupling member. A set screw 768 enters from the side of the female coupling to secure the flexible conduit liner.

To assemble a torch extension, a piece of tubing is cut to the desired length, D'. A male coupling member 752 is pressed into a first end of the extension body 754. A female coupling member 756 is pressed into the second end of the extension body. A length of flexible conduit liner 758 is inserted through the central liner hole 770 of the male coupling until it is flush with the bottom of the threaded cavity 766 at the female coupling 756. The liner is secured by way of the set screw 768. (The flexible conduit liner can be left protruding slightly at each end.)

Referring to FIG. 7F, the female coupling member mates with a male coupling member of any other torch extension or the male coupling member of a torch. The fit is such that male and female coupling members assemble together leaving their flexible conduit liners in line with one another and also leaving a small gap between the end surfaces containing the small axial holes for inert gas. This gap allows the inert gas to travel from one set of holes to the opposed set of holes whether lined up or not after torches and extensions are assembled.

Wire is fed through the flexible conduit liner at the male coupling end. The liner guides the wire through the extension body and into the female coupling member.

Electrical current travels through the coupling members and the extension body to the torch, which may be metal, or other current-carrying material.

Referring to FIG. 7G, screw threads of the extensions and torches result in random orientation between components. Orientation fitting 772 allows torches and/or extensions to be secured to the torch holder 110 with proper orientation of nozzle direction with slide or other offset. Orientation fitting 772 consists of nut 774 sized for threaded engagement with the hole 120 provided in the torch holder 110, and fitting 776 having a flange 777 for engaging with the nut, and a bore 778 threaded internally for receiving a male coupling, e.g., of an extension or torch. After a torch system is assembled with the fitting 776, the fitting is rotated in nut 774 to the proper orientation and nut 774 is tightened into holder 110 to secure the torch in the desired postion.

Also referring to FIG. 7H, there is shown an adjustable ball joint adapter 780. The purpose of this adapter is to increase the range and versatility of the various torches. It can be placed at any joining location between orientation fitting and torch. When installed, it allows the torch tip to be moved radially to increase or decrease its range by allowing bending or angling of the extension system so that it may deviate from the spindle axis. This can provide rough adjustment, to be combined with the fine adjustment accomplished by the offset head knob, or can be used alone, without offset, if desired or necessary. The further from the torch the ball joint is placed, the greater the diameter range obtained, and, with this ball joint, one or two torches could conceivably cover an entire broad range of hole sizes.

The adjustable ball joint adapter 780 consists of a ball swivel 782, a swivel body 784, and a clamping nut 786. The ball swivel 782 is turned from a short cylindrical piece of bar stock. The bar stock is drilled and tapped at a first end to accept the male coupling member of an extension or torch. The second end of the bar stock is machined to a spherical shape connected to the stock by a neck of reduced diameter. A hole 788, smaller than the diameter of the neck, is coaxially drilled part way into the bar stock from the ball end. This hole is drilled to the end of the neck so it will not break into the tapped hole of the first end. A smaller hole 789, sized to accept a length of flexible conduit liner 790, is drilled to connect the two larger holes. Surrounding this liner hole are several smaller holes 792 to pass inert gas though the member. A set screw 794 secures the flexible conduit liner by way of a threaded hole.

The swivel body 784 is machined from a short length of a larger diameter bar stock than the ball swivel. A first end is bored and a concave radius is machined at the bottom of the bore forming a socket to accept the ball swivel spherical end. Threads 796 are machined in the bore up to the socket. In the bottom of this socket, a hole 797 is drilled coaxially with the bore to a shallow depth. The diameter of this hole is about the same as the hole through the neck section of the ball swivel member. The other end is machined with an external thread to fit the female end of an extension or the orientation fitting. A hole 798 is drilled coaxially to hold flexible conduit liner 790 and several smaller holes 799 are drilled axially around this one to transmit inert gas.

The clamping nut 786 is made from a short piece of hexagonal bar stock with external threads machined on a first end. These threads mate with the internal threads of the swivel body. The nut is then bored to a large diameter and a concave radius (to match the ball swivel) is machined at the threaded end at the edge of the bored hole.

To assemble the ball joint adapter, the ball swivel is placed into its socket in the swivel body. The clamping nut is slipped over the shank of the ball swivel and threaded into the swivel body to snug the spherical end of the ball swivel into its socket. A suitable length of flexible conduit liner is inserted into the central hole of the swivel body until it protrudes slightly into the tapped hole of the ball swivel. The other end should protrude slightly from the male fitting of the swivel body. The set screw 794 in the ball swivel is tightened to secure the conduit liner.

In use, the clamping nut can be loosened and retightened each time the user wants to bend or angle the torch, or the tension on the clamping nut can be such that the joint can be swiveled but there is sufficient friction to hold the members in the desired position.

The ball joint seals to prevent leakage of inert gas and is metallic to conduct electrical power to the torch.

Figure 8:
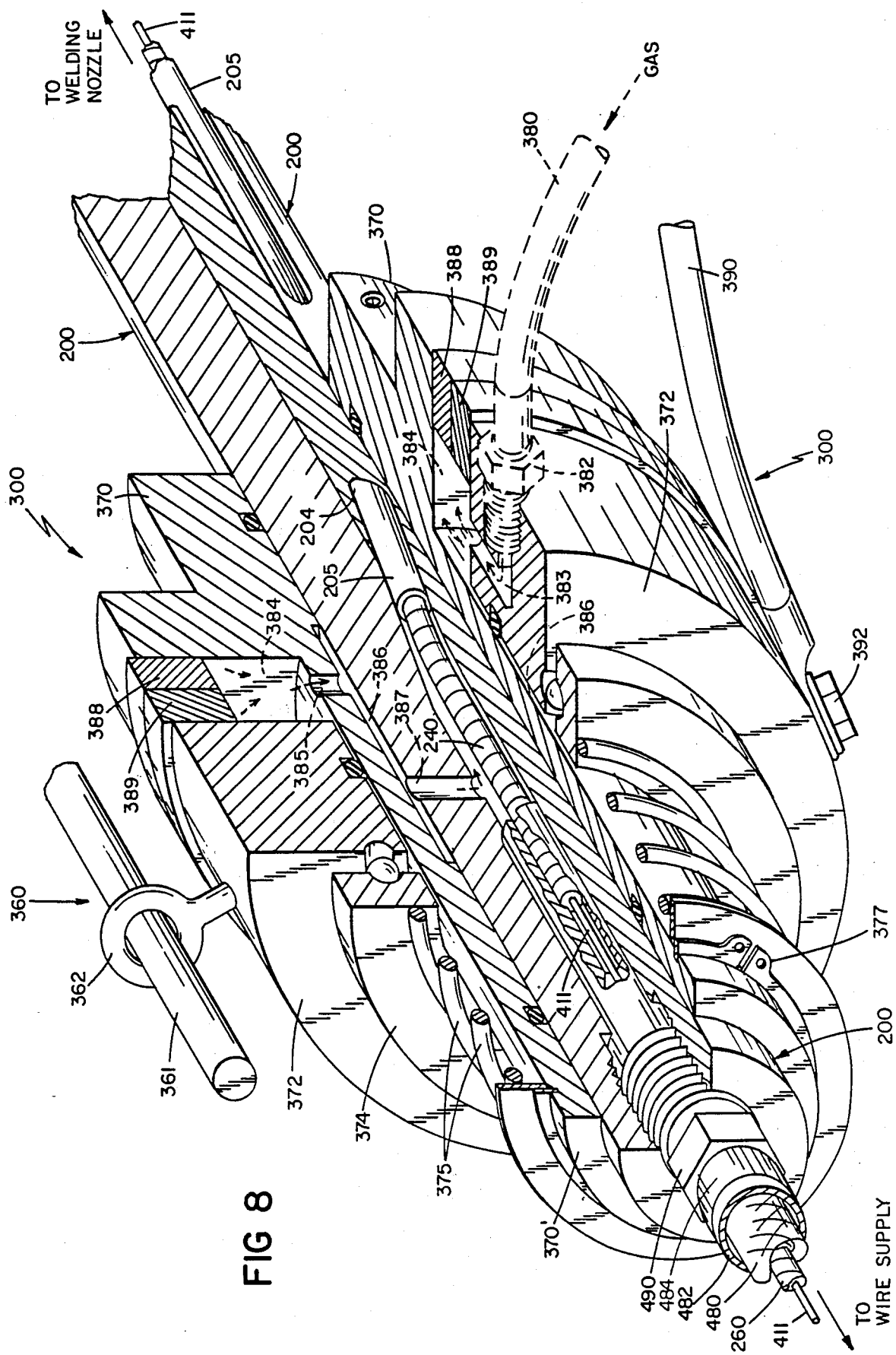
FIG. 8 is an enlarged perspective cross-sectional view of the rotatable power connector of FIG. 3.

Referring now to FIG. 8, the rotatable power connector 300 provides for transfer of electrical power to the rotatable spindle and to the welding nozzle of the orbital welding torch at the weld site. As shown in FIG. 8, the rotatable power connector comprises first and second bronze washers, 388 and 389, respectively, a rotatable housing 370, and another housing 372 preferably also made of solid bronze. The first bronze washer 388 is silver soldered to the rotatable housing 370. The second washer is silver soldered to housing 372 and the washer and attached housing are slipped over a stem portion 370' of rotatable housing 370 so that the second washer lies contiguous to the first washer.

The second washer 389 and housing 372 are held in sliding contact with the first washer 388 and rotatable housing 370 by a spring 375 through a ball thrust bearing 374. As shown in FIG. 8, metal spring 375 holds thrust bearing 374 against housing 372 thereby forcing bronze washers 388 and 389 into sliding contact insuring good electrical transfer. A snap ring 377 maintains spring pressure. Current from a power source (not shown) is fed to the rotatable power connector via the electrical power cable or conduit 390. Current then passes to the rotatable spindle and the orbital welding torch connected thereto. The metal construction of the housing parts of the power connector provide the electrical power transmission means for the rotatable power connector. Current enters rotatable power connector 300 through attachment of the cable 390 by bolt 392 to the outer surface of housing 372. This current flows through power connector housing 372 to bronze washer 389 and then to housing 370 by way of the sliding contact with bronze washer 388. Finally, the current passes to the rotatable spindle 200 to which housing 370 is fixed.

Housing 372 is prevented from rotating by torque resisting means 360 consisting of eye screw 362 attached to the outer surface of the housing 372 and adapted to receive and hold a torque resisting bar 361 which is non-conductively attached to a stationary platform (FIG. 1). Any turning movement of the housing 372 is resisted by the torque resisting bar.

By preventing housing 372 from rotating, the rotatable power connector 300 allows the spindle 200 to rotate endlessly without entanglement of the power cable. Importantly, the configuration of the rotatable power connector allows the end of the spindle leading to the wire supply (lower left hand end in FIG. 8) to be left free for entrance of welding wire on center, eliminating problems with the wire twisting.

Referring again to FIG. 3, the welding control means for axially positioning the weld beads is provided by the quill positioner 210 consisting of a housing or quill 220, and a step-up motor 250. As shown in FIG. 3, the ends of quill 220 are provided with bearings 222 for receiving and rotatably holding rotatable spindle 200 against relative axial movement. The quill forms a through cavity for holding the rotatable spindle 200, allowing it to rotate about its axis inside the quill when driven by rotating means 290.

The outside surface of the quill is provided with a rack 230 for transferring the quill and hence rotatable spindle 200 in an axial direction. As shown in FIG. 3, rack 230 is in mesh with pinion gear 241 which is secured, via shaft 241', to a worm gear 242. The worm gear in turn is in mesh with a worm 244 mounted on the shaft of step-up motor 250. As shown in FIG. 1, a trip pin 245, fixed to the rotating sprocket 297, trips switch 246 upon each revolution of the spindle 200 to actuate step-up motor 250.

During operation of the welding apparatus, operation of step-up motor 250 automatically moves quill 220 with rotatable spindle 200 up or down in the housing support structure 211 of the quill positioner 210. The housing support structure is secured to the welding stand 500, shown in FIG. 1. This motorized shifting of the quill and hence the rotatable spindle 200 repositions the orbital welding torch to a new effective weld depositing position as required for step-up welding.

A control panel (not shown) controls step-up motor 250 as well as rotating means 290 and wire feed motor 460. To provide step-up welding to a metallic object according to a preferred method of the present invention, the step-up motor is activated after each 360° of rotation of the spindle 200 and torch 10 by the limit switch 246 which is tripped by the pin 245 connected to the rotatable spindle. The distance of step-up is determined by control panel, pre-set by the operator, to switch on the step-up motor for a specific time interval and speed. Upon activation, the step-up motor causes the rotating rotatable spindle 200 in quill 220 and the attached orbital welding torch 10 to vertically climb by way of the rack 230 until the orbital welding torch is in a position contiguous to the just completed weld bead. During the climb of the rotating rotatable spindle, the control panel continues to maintain all other functions (wire feed, welding power, gas, rotation, etc.) thereby making the welding a continuous operation until the end of the welding task.

Referring to FIGS. 2 and 3, one embodiment of a remote wire feed unit 400 for use in the present invention, particularly in situations requiring the spindle to rotate at relatively high revolutions per minute, e.g., in buildup of bores of ⅜ inch (2 cms.) or less diameter, consists of wire reel 410, wire feed rotatable spindle 420, wire feed roll assembly 440, a torsionally rigid hollow flexible shaft 480, and a mounting platform 600. Mounting platform 600 includes a base plate 602, an upright 610 and a horizontal plate 620. Horizontal plate 620 is provided with an electrically isolated bearing block 622 for receiving and holding wire rotatable spindle 420. The wire rotatable spindle is rotatably suspended from horizontal plate 620 by bearing block 622.

The wire reel 410 is wound with welding wire electrode 411 and mounted on rotatable support bar 414, which is attached to one end of bracket 415. The wire reel rotates about the axis of the support bar as wire is payed out and fed to the welding unit. Wire feed rotatable spindle 420 is fixedly attached at the one end of bracket 415. By this connection of wire feed rotatable spindle to the wire reel, any rotation of the wire feed rotatable spindle causes bracket 415 to orbit or rotate about the axis of the wire feed rotatable spindle 420 and the wire 411 being fed therethrough. This forces the wire reel to rotate perpendicularly to its own axis and in line with the axis of the wire feed rotatable spindle.

The wire feed rotatable spindle is secured at the end opposite the bracket 415 to a wire feed roll assembly 440 which is similar to a conventional unit. The wire feed roll assembly includes a wire feed motor 460 (a gear reduction motor) which is drivingly connected to wire feed drive roll 452. A pressure roll 454 presses welding wire against feed drive roll 452. The drive roll grips the wire, draws it from the reel and pushes it into the hollow flexible shaft 480 for communication with the orbital welding torch.

Because wire feed rotatable spindle 420 is rotating, power must be supplied to wire feed motor 460 through slip rings 421 and 423. The slip rings are cast in epoxy along with connecting wires 421' and 423'. The assembly is bored to fit the wire feed rotatable spindle and machined to expose the slip rings on the outside diameter. The slip rings are connected by way of the connecting wires 421' and 423' to the electrical leads of the wire feed motor 460. The slip ring assembly is pressed onto the wire feed rotatable spindle 420 below the wire feed roll assembly 440 in such a manner that the slip rings are in sliding contact with carbon brushes 623 and 625 (FIG. 2) mounted on a vertical support member 624 protruding from the midsection of the horizontal plate 620. The carbon brushes are fixedly connected to electrical wires 623', 625' that are connected to a power control box (not shown). Power applied to the carbon brushes passes to the slip rings and is thus applied to the wire feed motor 460.

The rotation of the wire feed device 400 is synchronized with the rotation of the orbital welding torch 10 by way of synchronizing means such as the torsionally rigid hollow flexible shaft 480 extending through hose 482. The shaft 480 is fixed at one end to the wire feed roll assembly 440 and is driven from the bore build-up unit by its connection, at its other end, to the rotatable spindle 200. As shown at the lower left hand end of FIG. 8, this latter connection is effected by the threaded connector 490 secured in the threaded end of the spindle 200. Connection of the torsionally rigid shaft between the spindle 200 and the spindle 420 causes the spindles 200 and 420 to rotate together at the same speed and in the same direction as measured with respect to the path of feed of the wire passing through them. In an alternative, synchronizing means may comprise a gear train connected between the wire feed rotatable spindle 420 and the rotatable spindle 200 of the bore build-up unit.

Figure 11:
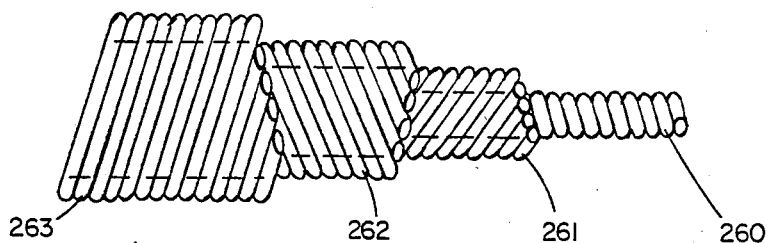
FIG. 11 is a view, partially broken away, of the torsionally rigid hollow flexible shaft of the present invention.

As shown most clearly in FIG. 11, the torsionally rigid hollow flexible shaft 480 includes the internal conduit liner 260. The liner is comprised of a spirally wound cylindrical wire of metal forming a non-compressible hollow flexible structure. On the outside of this liner are placed three outer layers of spirally wound wire casings 261, 262, 263. Each casing is separately comprised of four cylindrical wires wound as a set over a mandrel. The internal diameter of the first casing 261 in its relaxed state is made slightly smaller than the outside diameter of the preformed conduit liner 260 by using a mandrel of appropriate size. The first layer defined by casing 261 is assembled onto the conduit liner 260 by holding the opposite ends of the casing and turning them in an untightening direction. This enlarges the inside diameter of the casing and permits insertion of the liner 260. This combined structure 260, 261 is then inserted into the next casing 262 by similarly turning the latter in an untightening direction. Casing 262 is made with an internal diameter slightly less than the outside diameter of the assembled inner liner 260 and casing 261. This procedure is then followed to insert the combined structure 260, 261, 262 into the casing 263 which itself has been previously constructed with a preformed internal diameter slightly less than the outside diameter of the assembled inner liner and casings 261 and 262.

In assembling the casings 260–263, each one is secured onto the immediately underlying one with the lay of the wires opposite each other. This increases the resistance of the combined structue to torsional twisting. Also, the radial tightness of each casing upon the underlying casing holds them together. The composite casing becomes a torsionally rigid yet flexible hollow shaft which can be made in lengths long enough to permit placement of the wire feed device at a location remote from the weld build-up unit.

Figure 12:
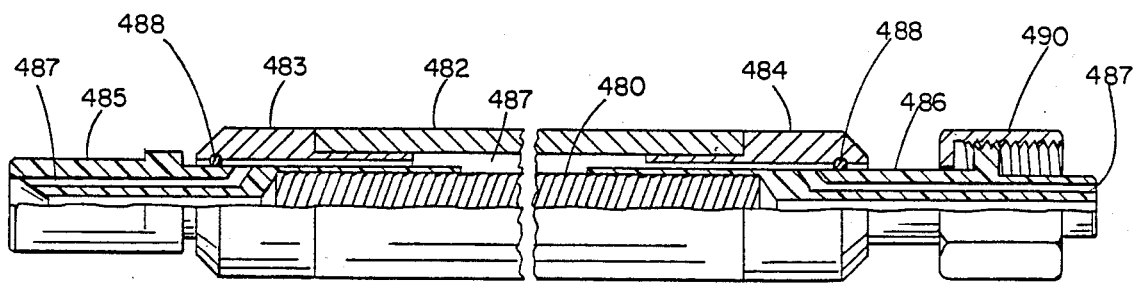
FIG. 12 is a side view, partially broken away, of the torsionally rigid shaft and casing assembly of the present invention.

To contain the shaft during rotation, it is placed within a tubular casing 482 shown in FIG. 12. The casing is desirable for situations where the shaft 480 must be long and exposed to entanglement during its rotation, and the casing, with the shaft 480, provides a conduit for passage of inert gas from slip coupling 381 (FIG. 2). Each end of the casing 482 is provided with an end fitting 483, 484. The fittings are constructed to slip over shaft end fittings 485, 486 fixed to the opposite ends of the shaft 480. The fittings 483, 484 of the casing are rotatably mounted on the shaft fittings 485, 486. The shaft end fittings, are, in turn, fixed tightly to the wire feed assembly 440 and the spindle 200, respectively, by suitable connections, and the fittings further define the conduit 487 for passage of the inert gas therethrough. Even though the casing is not secured against rotation, it does not rotate as the shaft 480 rotates.

Turning of the wire feed assembly as described above is necessary under certain circumstances where it is desired to synchronize the bore build-up unit and the wire feed unit to make them behave as if they were on a common rotating shaft, that is, as if the wire feed unit were inverted and placed on the end of the rotatable spindle at the power connector.

Wire from the wire feed unit 400 communicates with weld nozzle 12 in the following manner. The wire feed roll assembly 440 draws welding wire 411 from the wire reel 410 and feeds it into and through inner conduit liner 260 of the torsionally rigid hollow flexible shaft 480 which directs the welding wire into the flexible conduit liner 240 of the rotatable spindle 200 (FIG. 8). The wire then passes through the offset adjustment means member 100 (FIG. 6a) through the inner conduit 21 of the orbital welding torch 10 and finally into communication with weld nozzle 12.

Essential to operation of the welding apparatus of the present invention are the wire and main rotatable spindle, which retain the electrical potential applied to them by the external power sources even when the body of the welding apparatus is grounded. Referring again to FIG. 3, to electrically isolate the main rotatable spindle 220 from the body of the welding apparatus, the bearings 222 in the ends of quill 220 are of non-conductive material to electrically insulate the spindle from the quill. Referring to FIG. 2, to electrically isolate the wire rotatable spindle 420 from the horizontal plate 620 on the wire feed device mounting platform, a layer of insulating material is sandwiched between the outside surface of bearing block 622 and horizontal plate 620.

When considering the totally different concepts regarding the design and location of the components of my invention, it becomes evident that it is possible to build the described small, lightweight, completely portable bore build-up machine, utilizing both a remotely located wire feed assembly and remotely located control panel. Such an apparatus can be carried to the work site by one man and attached to the work by a magnetic base or by mechanical clamping means. There are very few restrictions in using the apparatus of the invention due to its extremely small size and light weight. The apparatus can be less than 18 inches (about 45 cms.) tall and have virtually nonexistent requirements for radial clearance. Using the concept of the invention, one can easily understand that there can be constructed a bore welding apparatus resembling a dentist drill, a slim basically cylindrical wand with all drive motors, controls, and bulky components placed at another location away from the weld site where space, or clearance is not at such a premium. It is evident that this would be difficult with prior art apparatus. My invention makes it possible to put the necessary cumbersome apparatus at a remote site without entanglement of the various connecting control cables, power lines, welding wire and gas hose.

The welding apparatus of the invention has been found to produce high quality weld deposits with excellent penetration. The apparatus may be used to resurface the interior of any diameter hollow structure as well as lay a layer of weld material to the external surface of any pipe or shaft of constant or varying radius.

ALTERNATE EMBODIMENTS

It is evident that numerous alternatives of the above described embodiments will be apparent to those skilled in the art in light of the foregoing descriptions. For example, with respect to the remote wire feed device unit of the present invention, such alternatives may include a stationary version in which the wire feed rotation spindle is mounted integrally to the quill positioner and spindles synchronized in rotation with a gear train. No torsionally rigid flexible shaft would be necessary, but merely a cased flexible conduit liner to direct welding wire into the rotatable spindle. Alternatively, where there is ample vertical clearance it would be unnecessary to have the wire feed spindle inverted. The wire feed rotatable spindle could be eliminated by placing the wire feed roll assembly with the spool bracket 415 attached directly on the end of the rotatable spindle.

Figure 9:
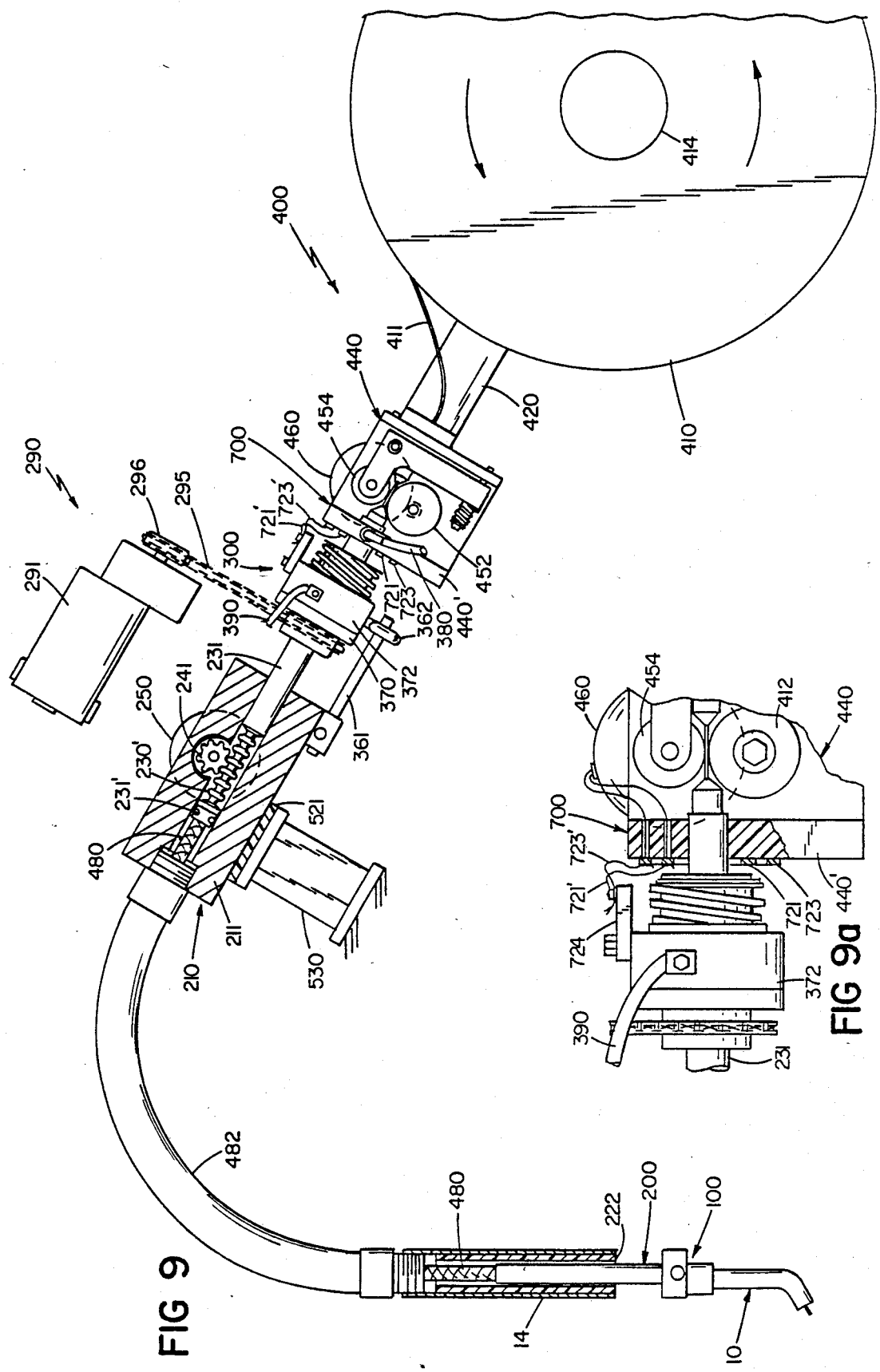
FIG. 9 is a side view of a further embodiment of a portable welding apparatus of the present invention with quill feeding device, rotation motor, rotatable power connector and wire feed device, all remotely located from a weld site.

With respect to the bore build up unit of the present invention, such alternatives may include an apparatus as shown in FIGS. 9 and 9a which depicts a slender welding wand whose body is capable of slipping into smaller, less accessible holes. In this version, the torsionally rigid hollow flexible shaft 480 is used for axial placement as well as rotational movement of the spindle 200. This allows for the placement of a quill positioner 210 and its gear train (not shown), step-up motor 250, rotatable power connector 300 with its power connection 390, gas connection 380, drive motor 291 and wire feed device 400 to the other end of the flexible shaft. Thus, all that is left at the weld site is a rotatable spindle 200, a miniature offset adjustment means 100 and orbital welding torch 10, with the adjustment means 100 and orbital welding torch 10 supported, with the spindle 200, in electrically insulated bushings 222 within a sheath 14, the spindle 200 being axially slidable in and out of the sheath. Shaft 231, (replacing the quill 220 of the previously described embodiment) is positioned in the quill housing 211 and is machined with grooves 230', resembling gear teeth, around the circumference of its midsection, as shown. These grooves take the place of the rack 230 in the original embodiment of FIG. 3. A pinion 241 is fixed on shaft of step-up gear motor 250 in mesh with these teeth on shaft 231. As step-up motor 250 is activated, the pinion 241 turns moving shaft 231 axially in housing 211.

The flexible shaft 480 is fixedly connected at its one end to shaft 231 and at its other end to rotatable spindle 200. Thus, any axial movement of shaft 231 results in a corresponding axial movement of rotatable spindle 200 in its sheath 14, producing step-up of the weld nozzle. Shaft 231 has a center bore as does the rotatable spindle 200, as in the previously described embodiment of FIG. 3. The flexible shaft 480 also acts as the electrical conduit for the welding power. In addition, the space between the flexible shaft 480 and outer casing 482 defines a conduit for passage of gas entering this space from outlet holes 231' in the shaft 231 to the orbital welding torch.

The groove 230' in shaft 231 allow drive motor 291 to rotate shaft 231 in the quill housing 211. This rotation is transferred by way of the flexible shaft 480 to the rotatable spindle and thus to the orbital welding torch. Electrical insulation 521 is sandwiched between housing 211 and mounting bracket 530 to achieve electrical isolation of the housing 211 to the base. Mounting bracket 530 can be of any desired configuration depending upon the requirements.

Slip ring assembly 700, shown most clearly in FIG. 9a, consists of flat rings 721 and 723 which are mounted on the end of the non-conductive housing end plate 440' of the wire feed housing 440. Copper spring brushes 721 and 723 held by housing 372 through non-conductive holder 724, transfer electrical power to the wire feed motor 460.

The welding wand in FIG. 9 need not be held nor clamped in position. It is merely slipped into the hole to be welded using bushings around its outside to center if necessary. Flexible shaft casing 482, being axially rigid, holds the wand sheath 14 in position and the rotatable spindle slips in and out of the sheath as desired for fine axial placement as well as for step-up. The casing 482 is also torsionally rigid so it holds sheath 14 from rotating.

Figure 13:
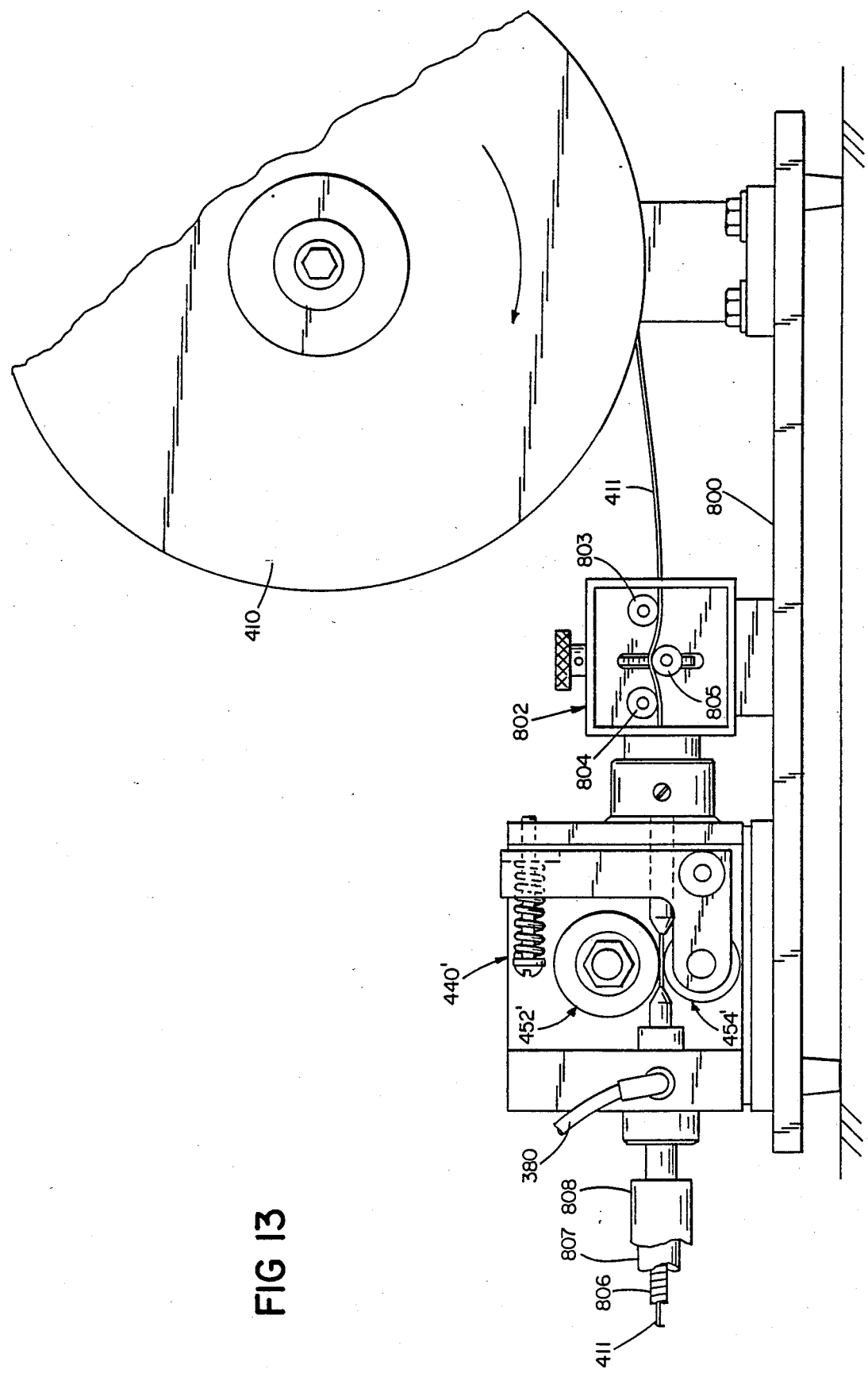
FIG. 13 is a side view of another embodiment of the remote wire feed unit of the present invention.
Figure 14:
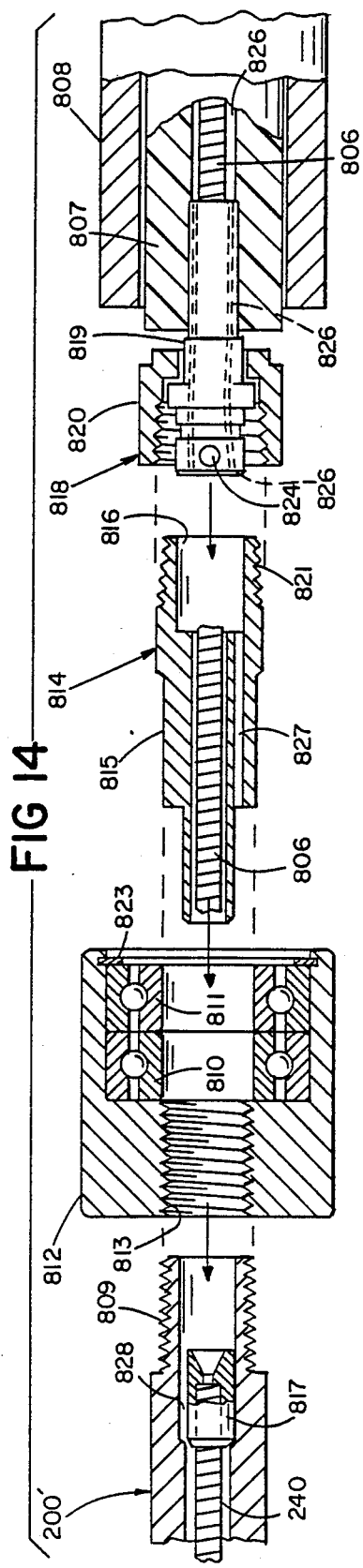
FIG. 14 is an exploded view of the coupling of the wire feed unit of FIG. 13 to the welding spindle of the apparatus.
Figure 15:
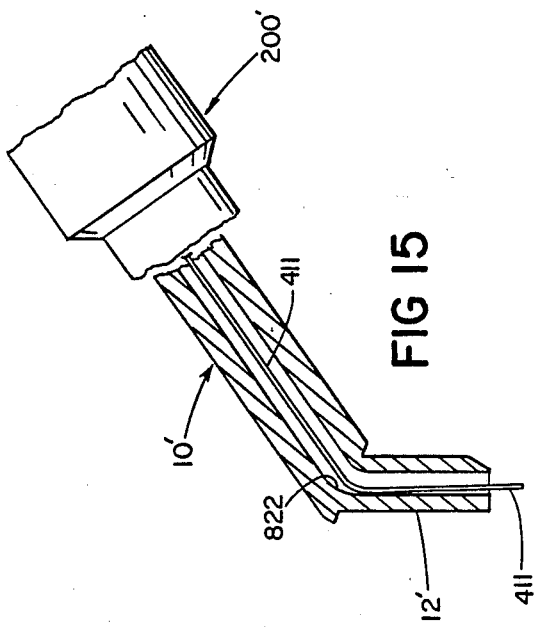
FIG. 15 is a schematic view of a welding nozzle showing the path of movement of the welding wire therethrough.

The construction of the welding apparatus with the wire held against rotation is shown in FIGS. 13-15. The apparatus differs from the embodiment shown, for example in FIG. 3, in the construction of the remote wire feed device and in its connection to the back end of the welding spindle.

As shown in FIG. 13, the wire reel 410 containing the spool of welding wire electrode 411 is fixed to a common support 800 with the wire feed roll assembly 440'. The support is fixed relative to ground. This differs from the embodiment shown in FIG. 3 where the wire reel rotates about the axis of the wire relative to the wire feed roll assembly 440, and is particularly suited for use in situations where the spindle is not required to rotate at high speeds, e.g., in buildup of bores have diameter greater than about ¾ inch (2 cms.).

In addition, the embodiment of the invention shown in FIG. 13 may include a wire straightening mechanism 802 mounted on support 800 between the wire reel 410 and the wire feed roll assembly 440', or a combined wire feed and straightening system may be employed, e.g., having feed rollers rotating about the axis of the wire, e.g., the "Roto-Drive" system of the type sold commercially by Cyclomatic of San Diego, California.

The wire straightening mechanism shown in FIG. 13 is a standard design and in construction includes three rolls 803, 804, 805. The first two rolls 803 and 804 are disposed along the path of feeding of the wire between the supply reel and the wire feed roll assembly, with each roll being in engagement with the wire on one side thereof. The third roll 805 is disposed between the first and second rolls on the other side of the wire. The third roll is laterally aligned with respect to the first and second rolls 803, 804 to push the wire laterally of its path of feed from engagement with the roll 803 to its engagement with the roll 804. This operation has the effect of straightening the wire into a relaxed linear configuration, that is, one with no tendency to coil or curve in the relaxed state.

After passing through the wire straightening mechanism 802, the wire feed roll assembly 440' feeds the straightened wire in the axial direction toward the welding spindle of the apparatus. In construction, the wire feed roll assembly includes a pair of rolls 452', 454' of the same construction as with the embodiment of FIG. 3. Due to the fact that the wire feed roll assembly 440' is fixed relative to the wire reel 410, the slip ring construction of FIG. 3 is no longer necessary.

The conduit between the non-rotating wire feed unit and the welding spindle of the apparatus is a standard conduit liner encased within a protective covering such as an air hose 807, which, with liner 806, defines a conduit for passage of inert gas introduced via gas conduit 380 connected to wire feed housing 440'. A third outer casing 808 is provided to control the bending of the wire as it is fed from the wire feed unit to the welding unit. In this regard, it is important that the bending not be so great that it induces a permanent bend or curve back into the straightened wire. Accordingly, the outer casing 808 is constructed with a minimum bending radius to thus limit the amount of bending to which the welding wire can be subjected. This minimum bending radius is greater than that which will cause permanent bending of the wire passing therethrough.

Since the wire feed unit is not rotating the wire relative to the welding spindle, it is necessary to provide a rotative coupling to the input end of the welding spindle. This coupling is shown most clearly in FIG. 14. The welding spindle 200' is identical in construction to the embodiment shown in FIGS. 3 and 8, except for the fact that the end receiving the wire from the wire feed unit is provided with a male threaded section 809 of the welding spindle 200'. A small spindle 814 is press fit into bearings 810, 811, held in place by snap ring 823, the inner races of the bearings seating on the surface 815 of the spindle. A section of conduit liner 806 is provided inside the small spindle 814. Also, at the input end of the small spindle, there is an opening 816 sized to receive the end of fitting 819. A transitional fitting 817 is provided in the welding spindle 200' adjacent the threaded end section 809 and has a funnel-shaped opening for guiding the welding wire into the internal conduit liner 240. This conduit liner is the same as that shown in the embodiment in FIG. 8.

To effect the connection of the wire feed conduit assembly 806–808, coming from the wire feed unit of FIG. 12, and also provide a conduit for passage of inert gas, a fitting 818 (FIG. 14) is provided. This fitting includes a first part 819 which is fixed to the end of the conduit liner 806 where it exits from the protective covering 807 by means of a set-screw 824. This part 819 is coupled to a threaded part 820 which is adapted to thread onto the threaded back end 821 of the small spindle 814. This coupling places the opposed ends of the conduit liner sections in the respective components in close proximity for smooth transition of the welding wire therethrough.

Inert gas passing within the conduit 825 between conduit liner 806 and covering 807 passes through fitting 819 about the conduit liner and through ports 826 (three at 120° spacing). coupling connection of fitting 819 within opening 816 provides a small gap between the opposed end faces of the fitting and the base surface of the opening for passage of gas from ports 826 into gas passages 827 (again three at 120°, with only one shown) in small spindle 814, without requiring alignment. Similarly, gas passes from passages 827 in spindle 814, about transition fitting 817, which is provided with flat 828 machined along one side for this purpose, and into the gas conduit about conduit liner 240 in spindle 200' for passage to the welding nozzle.

With the above coupling connection, the welding spindle rotates freely with the outer races of the ball bearings 810, 811 relative to the inner races thereof and the non-rotating wire feed unit. Further, in this construction the welding wire 411 will remain fixed against rotation as it passes through the welding spindle 200' and out the end of the welding nozzle 12' of the orbital welding torch 10'.

The internal construction of the welding nozzle is the same as with the other embodiments of the invention; and as shown in FIG. 15, engagement of the welding wire 411 with the inner wall surface 822 of the nozzle causes it to bend. This is so because the nozzle 12' extends at an angle to the longitudinal axis of the welding spindle 200'. This engagement of the wire along the inner wall surface of the nozzle will place a torsional load on the section of wire before the nozzle and rotate the wire within the nozzle due to the rotational forces acting on it by the rotating nozzle. This rotational or torsional force acting on the wire may tend to cause it to twist. With the present invention, any tendency in this respect is overcome by continuously feeding the wire at a linear speed which is great enough to prevent any build-up of torsional rotative forces acting on the wire, e.g., 200 inches (500 cms) per minute. In other words, the wire at any point along its length does not remain in the rotating welding nozzle long enough to permit any build-up of such torsional forces. With this construction, the wire exits from the welding nozzle in a constant uniform position with respect to the exit and thus with respect to the workpiece.

Figure 10:
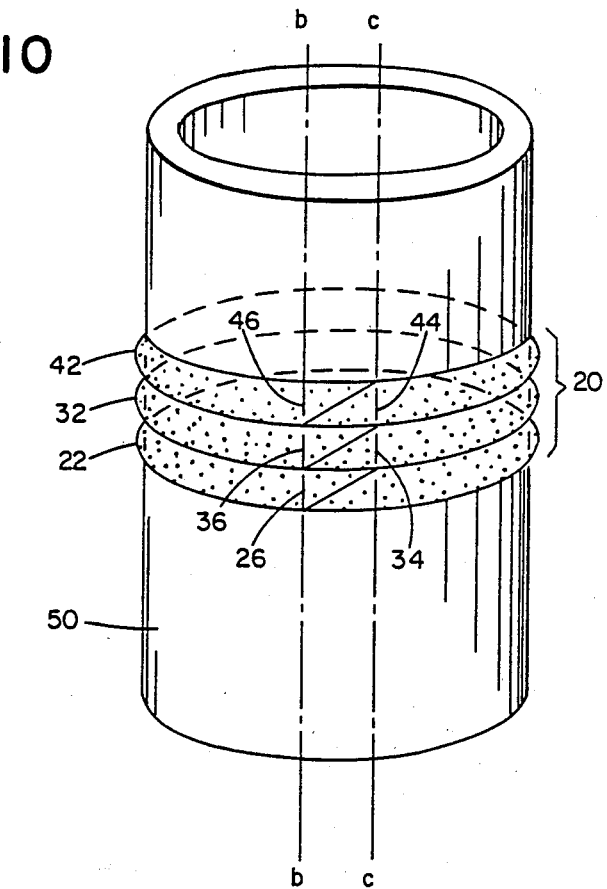
FIG. 10 is a view of a weld layer comprising circular weld beads along the outer surface of a workpiece.

FIG. 10 shows a weld layer 20 comprising circular weld beads 22, 32, and 42 along an outer surface of a metal tube 50 deposited in accordance with the preferred method of the present invention. The step-up welding of weld layer 20 begins with the orbital welding torch (not shown) depositing circular weld bead 22 and ends with the orbital welding torch depositing circular weld bead 42. The path traversed by the orbital welding torch in depositing circular weld bead 22 begins at limit point 26 along phantom line b—b, continues 360° back to limit point 26 and, during stepping between the limit point 26 to the phantom line c—c, continues to point 34 where circular weld bead 32 starts. In effecting weld deposit 22, the orbital welding torch is continuously rotated in a circular path from limit point 26 back to limit point 26, a rotation equal to about 360°. At the same time, electrical power and welding wire are provided. The welding wire is supplied from the wire feed device which is also being rotated in synchronization with the rotation of the welding torch or held stationary with the wire instead being straightened into a relaxed linear configuration. After this first stepping, the torch continues rotating in a circular path in an amount slightly less than 360°, from point 34 along phantom line c—c to a limit point 36 along phantom line b—b. Subsequently, the torch is stepped in the same manner as previously described in connection with weld bead 22, to a position contiguous to weld bead 32, for depositing weld bead 42. Weld bead 42 is then deposited by a 360° rotation of the orbital welding torch from starting point 44 along phantom line c—c to limit point 44 along phantom line c—c. In an actual welding procedure, weld bead 22 would be at the bottom of the tube 50 and weld bead 42 at the top edge with a number of intermediate beads 32 as required.

Both the distance between each limit point along phantom line b—b of each weld bead and the corresponding limit point along phantom line c—c of each contiguous weld bead and the speed that the welding apparatus steps from one weld bead to a contiguous weld beads are parameters programmed by an operator into the control panel (not shown). With no discontinuities in the welding operation at the point of step-up, a continuous weld is effected by the method of the present invention which is of uniform high quality throughout. Consequently, the welding using the present invention minimizes stress failures usually incident to discontinuous operation of a welding apparatus at the point of step-up.

Additionally, with respect to weld build-up, since step-up occurs only during a specified time interval during completion of each circular weld, the circular weld deposits made by the orbiting welding head as it traverses a metal object remains essentially perpendicular to the axis of the bore. That is, the plane in which each circular weld bead lies is perpendicular to the longitudinal axis of the cylindrical object being worked on. If the weld bead were to travel in a helical pattern, as a continuous gradual feed in conjunction with rotation would produce, a circumferential triangular wedge would be left unwelded at the beginning and the end of each bore being welding. This is unsatisfactory in most cases. Neither should one return to the unwelded portion to fill in the void. In bore build-up welding it is desirable to complete the operation, once started, without breaking the electric arc as each successive bead tempers the preceding bead and preheats the path to be followed by the next weld bead helping to relieve stresses and reduce hard spots, leaving a homogeneous weld surface uniform in hardness and grain size. Having the plane of the weld bead perpendicular to the axis of the bore eliminates the unwelded wedge and the necessity of going back to fill in the unwelded portion.

OTHER EMBODIMENTS

While the above invention has been described in conjunction with specific embodiments, it is evident that numerous alternatives, modifications and variations will be apparent to those skilled in the art in view of the foregoing description, and other embodiments are included within the claims.

For example, while I have described a form of my invention utilizing an offset adjustment means, the invention contemplates a welding apparatus which does not include an offset adjustment means. Adjustment may be accomplished by interchanging torches, or by use of the ball joint adapter. Also, while the foregoing description refers to step-up operation, the apparatus contemplates effecting a helical weld bead instead of intermittent step-up if desired by merely operating the step-up means continuously.

It should also be apparent that step-up need not be electrical but instead could be mechanical, such as a ratchetting means that could be operated by revolution of the rotatable spindle stepping the torch to the next weld circle, or such as a continuously rotating screw to form a helical bead.

In the rotatable power connector, shown in FIG. 8, one of the washers, e.g., washer 389, may be formed of a current conductive material other than bronze, e.g., carbon, or a washer of carbon or other current-conductive material may be disposed between washers 388, 389.

In another embodiment, the passageway through the rotatable spindle may be sized to allow a piece of steel tubing to be inserted in the central portion of the spindle to extend the entire length of the spindle 200 from the power connector into communication with the offset adjustment means 100, e.g., where the length of the spindle is too long for center boring. In this embodiment, the major length of the spindle may be constructed with a groove 204' extending along its surface meeting angled holes at each end of the spindle. In this embodiment, the tube provides the enclosed passage along the spindle, and the flexible conduit liner 240 extends the entire length of the steel tubing, with the clearance between the outside of the conduit liner and the inside of the steel tubing defining the passage for inert gas to communicate with the orbital welding torch.

If desired, the inert gas may be introduced via the rotating power coupling, e.g., via hose 380' shown in dashed line in FIG. 8, although this is less preferred for reasons of manufacturing. Also, there is a potential for deterioration of the lubricant within the rotating power coupling due to exposure to the flow of inert gas. Referring to FIG. 8, inert gas from conduit 380' may enter the rotatable spindle through crosshole 387 in the rotatable spindle shaft by entering into housing 372 of rotatable power connector 300 by way of fitting 382. The gas is guided through crosshole 383 to hollow chamber 384, then through crosshole 385 to hollow chamber 386, and from there into crosshole 387 which leads to the cavity formed between flexible conduit liner 240 and the wall surface of the bore 204 of the rotatable spindle.

I claim:

1. Apparatus for weld build-up on a surface of revolution, comprising:
   an elongated, rotatable assembly that supports, at one end, an electrical welding torch that terminates in a nozzle,
   said rotatable assembly being adapted to introduce electrical welding current, inert gas, and welding wire to the torch,
   characterized in that
   said assembly comprises an electricity conducting, hollow, metal drive spindle (200) consisting of an outer, elongated, hollow tubular body,
   said apparatus further comprising,
   means for direct application of driving motion (240) to said outer tubular body for rotation of said torch, and means for conducting electrical current (300) into said tubular body of said metal drive spindle for transmission along the electrically live outer body to the torch (10), and
   the gas and welding wire pass within said electrical current-carrying, hollow spindle to the torch.

2. The welding apparatus of claim 1 further comprising:
   (a) means for continuously rotating said spindle without axial movement; and
   (b) means (210) for moving said spindle stepwise in an axial direction at the completion of each circumferential pass of said nozzle over said surface to axially reposition the welding nozzle for depositing successive, side-by-side, circular weld beads along said surface as said nozzle rotates with said spindle.

3. The welding apparatus of claim 1 or 2 further characterized in that said conductive spindle (200) is rotatably mounted by insulative bearings (222), within a hollow quill, said quill being non-rotatably mounted in a manner permitting axial motion, thereby to move said spindle axially.

4. The welding apparatus of claim 3 further characterized in that said conductive spindle is driven by a motor insulated from said electrical current-carrying spindle by insulative belt (295), said motor being mounted to move axially with the spindle (at 290).

5. The welding apparatus of claim 1 further characterized in that a power connector (300) introduces welding current from a stationary source directly to the conductive spindle (200), at a point spaced downstream from the position (at 490) at which said welding wire and gas are introduced into the spindle.

6. The welding apparatus of claim 5 wherein said welding wire is slidably confined within a non-insulated liner disposed within a bore of said conductive hollow spindle.

7. The welding apparatus of claim 1 including an electrically conductive carrier (110) mounted in a radially adjustable, electrically continuous, offset relationship to a conductive body (140) joined to the end of a spindle, the torch being held in electrically conductive relationship by said carrier.

8. The welding apparatus of claim 7 wherein said electrically conductive body and carrier define a gas tight passage (FIG. 6a) extending from said spindle to said torch, a connection cavity means being defined at a motion interface between said carrier and said body to maintain gas flow continuity therebetween over their range of offset adjustment.

9. The welding apparatus of claim 7 or 8 wherein said carrier comprises a metal block having a slidable connection (112) interfitting with a mating connection (142) on said body and a threaded connection (120) for holding said torch.

10. The welding apparatus of claim 8 wherein said welding wire (411) is slidably confined within a liner (240) that extends from the hollow spindle, through said cavity means and through the passage within said carrier, to said torch.

11. The welding apparatus of claim 1 wherein said torch comprises an electrically conductive body threaded in electrically conductive relationship to its support.

12. The welding apparatus of claim 11 wherein an electrically conductive torch extension (750) supports said torch body, said torch extension in turn being threaded in electrically conductive relationship to its support.

13. The welding apparatus of claim 1 wherein said means for conducting electrical current to said drive spindle comprises a rotatable power connector (300) comprising first and second metal housings (370, 372) and first and second current-conductive washers (389, 388); said first housing being fixedly attached to said spindle, said second housing being provided with an electrical power conduit (390), said first washer being fixedly attached to said first housing, said second washer being fixedly attached to said second housing, and both said second washer and said second housing being slipped over a stem (370') of said first housing; said housings and said washers providing said rotatable power connector with electrical power transmission means.

14. The welding apparatus of claim 13 wherein the second washer lies contiguous to the first washer and is held in sliding contact to said first washer by a securing means (374).

15. The welding apparatus of claim 13 wherein the power connector further comprises:
    (a) a stem portion (370') extending axially from the second housing through said first housing and in encircling relationship with said spindle to define a first annular chamber between the stem portion and spindle; and
    (b) slidable electrical contact surfaces fixed to said housings and in axial electricity conducting engagement with each other at a location radially outward of said stem portion, said housings being axially spaced from each other between said stem portion and the electrical contact surfaces to define a second annular chamber.

16. The welding apparatus of claim 13 wherein the rotatable power connector is made of a solid bronze.

17. The welding apparatus of claim 13 wherein the rotatable power connector is attached about said rotatable drive spindle, leaving said first end of the spindle free for entrance of welding wire and inert gas.

18. The welding apparatus of claim 13 wherein said rotating power connector comprises torque resisting means (360) including an eyescrew (362) attached to an external surface of the second housing for receiving and holding a torsional resistance bar (361) that is attached to a stationary surface.

19. The welding apparatus of claim 13 wherein said securing means comprises a spring through ball thrust bearing.

* * * * *

UNITED STATES PATENT AND TRADEMARK OFFICE
CERTIFICATE OF CORRECTION

PATENT NO.   : 4,892,990

DATED        : January 9, 1990

INVENTOR(S)  : Rees Acheson

It is certified that error appears in the above-identified patent and that said Letters Patent is hereby corrected as shown below:

In the Abstract:

Line 13, delete "(b 140)" and insert therefore --(140)--.

Column 5, line 17, change "on" to --up on--.

Column 10, line 27, delete "e.t." and insert --et--.

Column 21, line 29, delete "coupling" and insert --Coupling--.

Signed and Sealed this

Sixteenth Day of July, 1991

Attest:

HARRY F. MANBECK, JR.

*Attesting Officer*          *Commissioner of Patents and Trademarks*